US009985570B2

(12) United States Patent
Endoh

(10) Patent No.: US 9,985,570 B2
(45) Date of Patent: May 29, 2018

(54) MOTOR CONTROL APPARATUS

(71) Applicant: DENSO CORPORATION, Kariya, Aichi-pref. (JP)

(72) Inventor: Go Endoh, Kariya (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 179 days.

(21) Appl. No.: 14/926,351

(22) Filed: Oct. 29, 2015

(65) Prior Publication Data

US 2016/0126877 A1 May 5, 2016

(30) Foreign Application Priority Data

Nov. 4, 2014 (JP) .................................. 2014-224081

(51) Int. Cl.
*H02P 29/64* (2016.01)
*B62D 5/04* (2006.01)
*H02P 21/22* (2016.01)

(52) U.S. Cl.
CPC ............ *H02P 29/64* (2016.02); *B62D 5/0409* (2013.01); *H02P 21/22* (2016.02)

(58) Field of Classification Search
CPC .... H02P 29/64; H02P 21/0035; B62D 5/0409
USPC ................................ 318/400.02, 400.01, 700
See application file for complete search history.

(56) References Cited

U.S. PATENT DOCUMENTS 5,572,169 A * 11/1996 Iwamoto ................. H03L 1/028
331/1 R
5,859,373 A * 1/1999 Munzebrock ........... B66C 13/16
73/862.193
9,278,708 B2 * 3/2016 Kouichi ............... B62D 5/0469
2005/0242760 A1 * 11/2005 Fujita ....................... H02P 21/16
318/434
2005/0257986 A1 11/2005 Kagei
2007/0216340 A1 * 9/2007 Iura ........................... H02P 27/06
318/801
2012/0049782 A1 3/2012 Suzuki
(Continued)

FOREIGN PATENT DOCUMENTS

JP 2005204358 A * 7/2005
JP 2009-17707 A 1/2009
JP 4483298 B2 6/2010

OTHER PUBLICATIONS

Machine translation JP2005204358.*

*Primary Examiner* — Kawing Chan
(74) *Attorney, Agent, or Firm* — Knobbe, Martens, Olson & Bear, LLP

(57) ABSTRACT

A motor control apparatus that estimates a temperature of a temperature estimation target element at a time of energizing the motor and drives a motor by controlling an electric power is provided. The motor control apparatus includes a primary delay arithmetic unit that outputs a primary delay response as an amount of temperature change, a sensor value adder that adds a sensor value of a temperature sensor to the amount of temperature change, an offset adder that adds an offset temperature to an output of the sensor value adder, a response constant determination portion that determines the gain and the time constant, and an offset temperature determination portion. At least one of the response constant and the offset temperature is changed according to a supply voltage or an input voltage.

3 Claims, 25 Drawing Sheets

(56) References Cited

U.S. PATENT DOCUMENTS

2013/0342148 A1* 12/2013 Yanai .................. B62D 5/0484
                                                          318/472
2015/0145445 A1*  5/2015 Kim ...................... H02P 29/68
                                                        318/400.02

* cited by examiner

3-PHASE MOD Iq<0

LOW FLATBED 2-PHASE MOD

LOW MOS EST CASE    COMPARISON EXAMPLE

LOW MOS EST CASE

MOTOR CONTROL APPARATUS

CROSS REFERENCE TO RELATED APPLICATION

This application is based on Japanese Patent Application No. 2014-224081 filed on Nov. 4, 2014, the disclosure of which is incorporated herein by reference.

TECHNICAL FIELD

The present disclosure relates to a motor control apparatus having an overheating prevention function.

BACKGROUND

Patent literature 1: JP 4483298 B2
Patent literature 2: JP 2009-17707 A

Conventionally, a motor control apparatus has been known. The motor control apparatus estimates a temperature of electronic components (for example, elements) configuring a motor coil or an electric power converter. And the motor control apparatus limits a current command value to prevent overheating. A temperature estimation method of a motor coil disclosed in Patent literature 1 inputs a time average of an integrated value of a current squared value, the current being supplied to the motor coil, to a primary delay function. The temperature estimation method estimates the temperature of the motor coil. Patent literature 2 calculates estimated temperature in each phase (also referred to as an each phase estimated temperature) by adding a temperature measurement result of an inverter measured by a temperature sensor before starting a motor rotation to a predicted calorific value that is estimated based on each phase current when rotating a motor.

The temperature estimation method in patent literature 1 estimates the temperature of the motor coil. This method may be also used in a temperature estimation of an electric power converter. In combination with the technique disclosed in patent literature 2, a configuration of adding "the primary delay response obtained by inputting the time average of the integrated value of the current square value to a primary delay arithmetic unit" to "the temperature sensor value" and of estimating a temperature may be supposed. The inventor of the present application has found the following difficulty regarding the conventional technology.

According to a conventional technology, since the temperature is estimated from (i) the square value of the current supplied to the electric power converter and (ii) the value of the temperature sensor (also referred to as a temperature sensor value), the self-heat generation of the respective components before supplying the current to the electric power converter, and the amount of heat received from heat generation of other components may not be estimated in principle. When the amount of heat generation is uniformly added and corrected, a current may be excessively limited with a greatly expected temperature rise (that is, the temperature rise is estimated too much). The performance of the motor may not be effectively exhibited.

It is supposed that the temperature of the element (for example, IC) whose power consumption changes according to a power supply voltage is estimated by an addition of an offset temperature. When the offset temperature is set as a fixed value, a change in the supply voltage may not be reflected on the offset temperature. When the largest supply voltage is expected and the offset temperature is set from a viewpoint of fail-safe, the offset temperature may be excessively largely expected when the supply voltage is low. Thus, the current is excessively limited, and the performance of the motor may not be effectively exhibited.

When a temperature of a switching element in the electric power converter is estimated, since a duty changes as an input voltage of the electric power converter changes (for example, when the input voltage becomes higher, an on-duty of an upper arm element to the identical output is decreased), a heat generation state of the switching element may change. Therefore, when a gain and a time constant of the primary delay response are set as fixed values, it may not be possible to estimate the temperature in high precision.

When the duty of the switching element changes under a PWM (pulse width modulation) control, an on-time ratio allowing a current flow changes (for example, a temperature of the switching element with large on-duty increases in a motor lock state). Therefore, the sufficient estimation precision may not be obtained in a configuration without taking the duty into consideration.

For example, it is supposed that, in the PWM control of a three-phase motor, a motor control apparatus switches between three-phase modulation and two-phase modulation according to a voltage utilization rate. In that case, when the temperature is estimated under a condition of an electric angle range in which a duty is fixed to an upper limit by upper flatbed two-phase modulation for an upper arm element, and an electric angle range in which the duty is fixed to a lower limit by lower flatbed two-phase modulation for a lower arm element, the current may be excessively limited in the other electric angle range or the three-phase modulation. Thus, the performance of the motor may not be effectively exhibited.

In the switching element of each phase in a multi-phase motor, a difference (variation) in heat resistance or heat capacity of heat radiation from a junction of the switch element of each phase to a heat sink may occur due to a hardware factor such as a heat sink shape or a heat radiation structure. A heat generation difference may occur. In that case, when the temperature is estimated with reference to a phase having the largest heat resistance (temperature is liable to most increase) from the viewpoint of device protection, the temperature rise may be excessively largely expected for a phase relatively small in the heat resistance (temperature is difficult to increase). Thus, the current may be excessively limited, and the performance of the motor may not be effectively exhibited.

Thus, considering the change in the external factors or the control conditions, temperature estimation sufficiently high in precision cannot be performed conventionally. The performance of the motor may not be effectively exhibited. When the required torque is secured even under the current limit, a rating of components or a body size of the heat sink may be increased.

SUMMARY

It is an object of the present disclosure to provide a motor control apparatus that improves a temperature estimation precision of a target element by taking a change in external factors and control conditions into consideration.

According to one aspect of the present disclosure, a motor control apparatus that estimates a temperature of a predetermined temperature estimation target element at a time of energizing the motor and drives a motor by controlling an electric power supplied by an electric power converter is provided. The motor control apparatus includes a primary delay arithmetic unit, a sensor value adder, an offset adder, a response constant determination portion, and an offset temperature determination portion. The primary delay arithmetic unit receives a current square value of a current supplied to the motor or a time average of an integrated value of the current square value, and outputs, as an amount of temperature change, a primary delay response calculated using a gain and a time constant. The sensor value adder adds a sensor value of a temperature sensor to the amount of temperature change. The offset adder adds an offset temperature to an output of the sensor value adder. The response constant determination portion determines the gain and the time constant of the primary delay arithmetic unit, the gain and the time constant being a response constant. The offset temperature determination portion determines the offset temperature. At least one of the response constant and the offset temperature is changed according to (i) a supply voltage that is supplied to the temperature estimation target element, or (ii) an input voltage that is supplied to the electric power converter.

According to another aspect of the present disclosure, a motor control apparatus that estimates a temperature of a predetermined temperature estimation target element at a time of energizing the motor and drives a motor with multiple phases by controlling an electric power supplied by an electric power converter is provided. The motor control apparatus includes a primary delay arithmetic unit, a sensor value adder, and a response constant determination portion. The primary delay arithmetic unit receives a current square value of a current supplied to the motor or a time average of an integrated value of the current square value, and outputs, as an amount of temperature change, a primary delay response calculated using a gain and a time constant. The sensor value adder adds a sensor value of a temperature sensor to the amount of temperature change. The response constant determination portion determines the gain and the time constant of the primary delay arithmetic unit, the gain and the time constant being a response constant. The response constant determination portion changes the response constant according to (i) a change of heat generation estimated for the temperature estimation target element, or (ii) a difference of heat generation between phases estimated for the temperature estimation target elements in the multiple phases.

According to the motor control apparatus, it may be possible to improve a temperature estimation precision. With an improvement in the temperature estimation precision, it may be possible to always prevent an excessive limitation of current from being performed on the assumption of a condition of the most severe temperature rise. Thus, it may be possible to provide the performance of the motor effectively. It may be possible downsize the heat sink and the switching element while the equivalent performance is maintained. Thus, it may be possible to improve a temperature estimation precision of a target element by taking a change in external factors and control conditions into consideration.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Embodiments of a motor control apparatus according to the present disclosure will be described with reference to the drawings.

(Common Configuration)

A common configuration to the respective embodiments will be described. Incidentally, a phrase "the present embodiment(s)" means all embodiments, that is, a first embodiment to a six embodiment.

Figure 1:
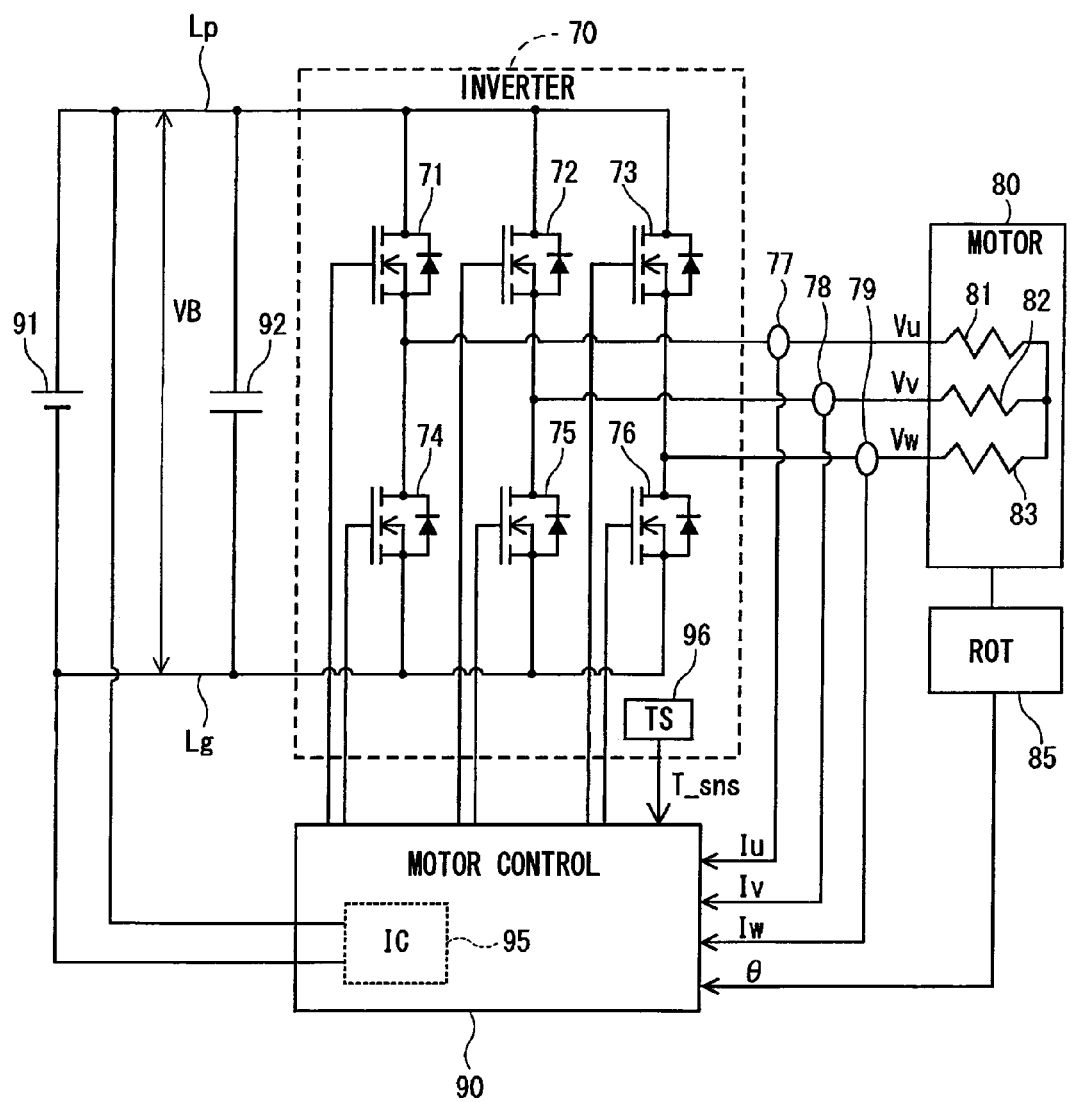
FIG. 1 is a diagram illustrating a schematic configuration of a motor drive system used in a motor control apparatus according to an embodiment of the present disclosure.

As illustrated in FIG. 1, a motor control apparatus 90 according to the present disclosure operates switching operation of an inverter 70 to control energization of a motor 80. The inverter 70 is an example of an "electric power converter". A phrase of energization means to supply electric power or current. The motor 80 according to the present embodiment is a three-phase brushless motor having three-phase motor coils 81, 82, 83. The motor 80 is used as a steering assist motor for assisting the steering operation of a driver, for example, in an electric power steering device of a vehicle. A rotor rotation angle of the motor 80 detected by a rotation angle sensor 85 is converted into an electric angle θ, and input to the motor control apparatus 90.

The inverter 70 has six switching elements 71 to 76 (that is, a switching element 71, a switching element 72, a switching element 73, a switching element 74, a switching element 75, and a switching element 76) connected in a bridge circuit, transforms a direct-current (DC) power of a battery 91 into a three-phase alternating-current (AC) power under a PWM control, and supplies the transformed power to the motor 80.

In the present embodiment, metal oxide semiconductor field effect transistors (MOSFETs) are used as the switching elements 71 to 76. Hereinafter, the switching elements 71 to 76 are also referred to as MOSs 71 to 76, respectively. "Upper arm elements" that are the switching elements on a high potential side are referred to as "upper MOSs 71, 72, 73". "Lower arm elements" that are the switching elements on a low potential side are referred to as "lower MOSs 74, 75, 76". Incidentally, a field effect transistor other than the MOSFET or an insulated gate bipolar transistor (IGBT) may be used in another embodiment.

The inverter 70 is connected to a positive side of the battery 91 through a power line Lp. The invertor 70 is connected to a negative side of the battery 91 through a ground line Lg. An input side of the inverter 70 is provided with a capacitor 92 to smooth a pulsation of an input voltage.

The battery 91 is a vehicle auxiliary machine battery of, for example, a rated voltage of 14V. In the present embodiment, a voltage VB of the battery 91 is an input voltage of the inverter 70 as it is.

The power paths from the inverter 70 to the motor coils 81, 82, 83 have current sensors 77, 78, 79 for detecting phase currents Iu, Iv, Iw of the respective phases, respectively. In another embodiment, a current sensor may be disposed between each of the lower MOSs 74, 75, 76, and the ground line Lg. The current sensors may be disposed in two of the three phases, and a current of the other phase may be estimated according to the Kirchhoff's law.

A temperature sensor 96 such as a thermistor is disposed on a substrate to which, for example, the MOSs 71 to 76 are mounted. A sensor value T_sns of the temperature sensor 96 is estimated as a temperature corresponding to a heat sink or an average initial temperature that is a base temperature of an element temperature estimation of the MOSs 71 to 76 on the same substrate.

The motor control apparatus 90 includes an IC 95 that functions as a microcomputer or a driver circuit (a pre-driver). The motor control apparatus 90 calculates a voltage command value on the basis of a torque signal input from the external portion, the phase currents Iu, Iv, Iw of the motor 80, and a feedback signal of the electric angle θ. In this case, the three-phase currents Iu, Iv, Iw are coordinate-converted into dq-axis currents Id, Iq under a known vector control. The motor control apparatus 90 operates the respective MOSs 71 to 76 of the inverter 70 on the basis of the calculated voltage command value under the PWM control.

In the PWM control, for example, in order to improve a voltage utilization rate, the duty of one or more phases by three-phase modulation or two-phase modulation may be increased or decreased in some cases. In another embodiment, a drive control of the inverter 70 may not be limited to the PWM control.

In the present embodiment, a voltage VB of the battery 91 is used as an operating power supply of the IC 95. Thus, the battery 91 is shared as an input power supply of the inverter 70 and an operating power supply of the IC 95.

The IC 95 may be integrated with a microcomputer performing a direct motor drive control as well as monitoring of the microcomputer, a sensor power circuit, a driver circuit of an inverter such as a charge pump, and a driver circuit that communicates with another device of the vehicle by a CAN (controller area network). The CAN is an example of a standard of a network available to a vehicle-mounted device and an associated equipment.

Incidentally, in general, when the MOSs 71 to 76 configuring the inverter 70 are energized by frequent switching operation, the MOSs 71 to 76 may generate heat. When the IC 95 is disposed to the same substrate as that of the MOSs 71 to 76, or at a position spatially close to the MOSs 71 to 76, a temperature of the IC 95 also rises with the heat generation of the MOSs 71 to 76. In order to prevent a failure of an element caused by the heat generation, the motor control apparatus 90 has an overheating prevention function of limiting an upper limit of the current command value on the basis of an estimated temperature of the element.

When the temperature of the element is estimated to be higher than an actual temperature, the current may be excessively limited. In this case, a performance that can be originally executed by the motor 80 may not be effectively exhibited. When a requested torque is ensured even under the current limit, the rating of the components and a body size of a heat sink may increase. In particular, in an electric power steering device of the vehicle, a large current may be required by a sharp steering operation, and a restriction of a mounting space may be severe.

Figure 25:
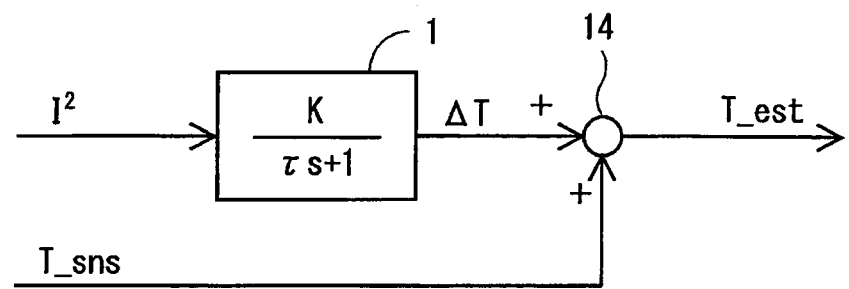
FIG. 25 is a block diagram illustrating a temperature estimation configuration according to a comparative example.

The temperature of the element is required to be estimated with precision as high as possible. For example, when the techniques disclosed in patent literatures 1 and patent literature 2 are combined together, a temperature estimation configuration illustrated in FIG. 25 may be obtained. The temperature estimation configuration in the comparative example includes a primary delay arithmetic unit 1 for calculating a primary delay response with an input of an integrated value of a current square value, and a sensor value adder 14 that adds a temperature sensor value T_sns (=initial temperature) to an output value (=the amount of temperature change) of the primary delay arithmetic unit 1.

Taking an external factor (for example, supply voltage) supposed in an actual motor control and a change in the control condition (for example, duty) into consideration, the temperature estimation sufficiently high in precision may not be performed in the comparative example. The temperature of the element may be estimated to be higher than the actual temperature, and the performance of the motor may not be effectively exhibited by an excessive current limitation.

A motor control apparatus according to the present disclosure improves a temperature estimation precision with an appropriate change of a constant used in temperature estimation calculation according to a change in the external factor such as the supply voltage or the control condition such as the duty, and avoids the current limitation, which is performed excessively. A specific configuration will be described for each of the embodiments.

A control block diagram of each embodiment illustrates only a characteristic configuration related to the temperature estimation. A configuration of a general motor control related to a feedback control or a PWM control is well known, and will be omitted from illustration and description.

First Embodiment

A motor control apparatus according to a first embodiment of the present disclosure will be described with reference to FIG. 2 to FIG. 6.

Figure 2:
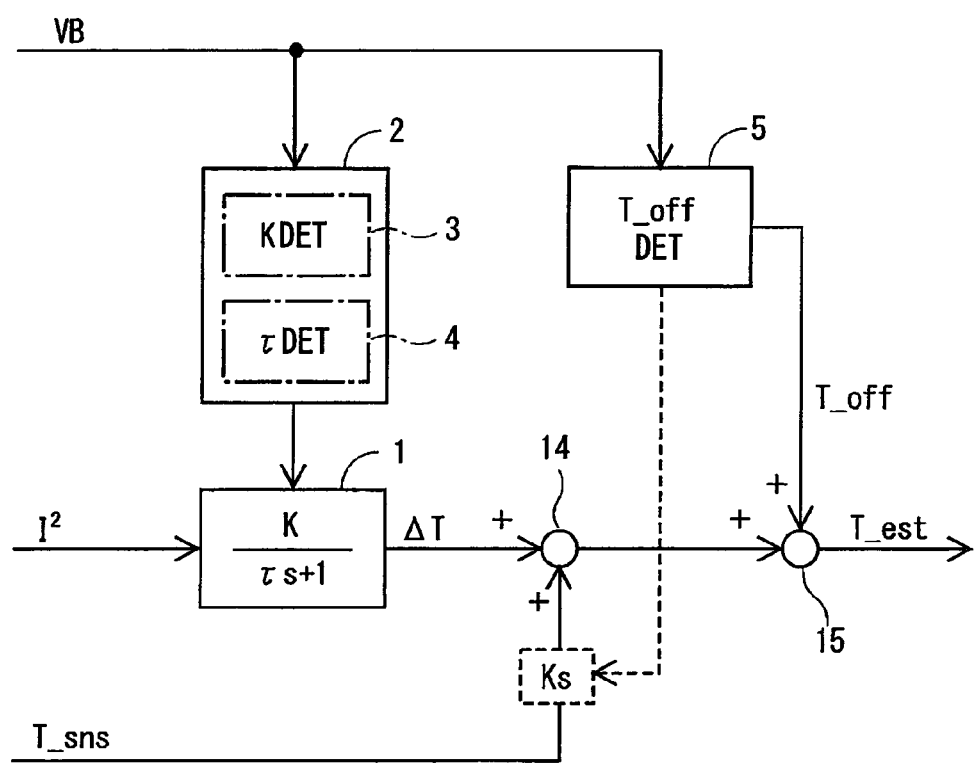
FIG. 2 is a block diagram illustrating a temperature estimation configuration according to a first embodiment.

As illustrated in FIG. 2, the motor control apparatus 90 in the first embodiment includes, as a configuration related to the temperature estimation, a primary delay arithmetic unit 1, a sensor value adder 14, an offset adder 15, a response constant determination portion 2, and an offset temperature determination portion 5. Incidentally, in the first embodiment, a drive control of the inverter 70 is not limited to the PWM control.

The primary delay arithmetic unit 1 receives a current square value ($I^2$) and a time average value ($\Sigma I^2/\Delta t$) of integrated values. Incidentally, the current square value of a current for energization of a motor may mean a current square value of current supplied to the motor. The current includes phase currents Iu, Iv, Iw, and dq-axis currents Id, Iq. The primary delay arithmetic unit 1 calculates a primary delay response using a transmission function of "$K/(\tau s+1)$" for the input current square value. In this case, K is a gain, and τ is a time constant. The calculation is executed, for example, in a period of several tens to several hundred milliseconds (integration operation when calculating the integrated value is executed in a shorter period), and the temperature rise is transitionally estimated.

The combination of the gain K with the time constant τ is referred to as a response constant. Also, a phrase that "response constant is changed" means "at least one of the gain K and the time constant τ is changed".

A power consumption W by energization is represented by "$W=I^2 \times R$" (I: current, R: resistance). The power consumption W is different in transfer amount and transfer speed, according to a heat resistance and a heat capacity of the element or a heat radiation unit (ex. a heat sink). The heat transfer amount and the transfer speed are reflected on the gain K and the time constant T. The primary delay response is calculated whereby the amount of temperature change of the element at t seconds after energization starts is transitionally estimated. In this way, the primary delay arithmetic unit 1 outputs the amount of temperature change ΔT with an input of the current square value ($I^2$) or the time average value ($\Sigma I^2/\Delta t$) of the integrated value of the current square value.

The primary delay arithmetic unit 1 is not limited to a single unit, but multiple primary delay arithmetic units may be disposed in parallel.

The sensor value adder 14 adds the sensor value T_sns detected by the temperature sensor 96 at the time of starting the energization of the motor 80 to the amount of temperature change ΔT output by the primary delay arithmetic unit 1. Since it is difficult to measure initial temperatures of the multiple temperature estimation target elements individually, the sensor value T_sns of the temperature sensor 96, for example, disposed to the same substrate is regarded as the initial temperature of the respective temperature estimation target elements.

The offset adder 15 further adds an offset temperature T_off to an output of the sensor value adder 14, and outputs the added temperature as an estimated temperature T_est.

The response constant determination portion 2 includes a gain determination portion 3 and a time constant determination portion 4. The response constant determination portion 2 determines the response constant, which is the gain K and the time constant r of the primary delay arithmetic unit 1.

The offset temperature determination portion 5 determines the offset temperature T_off.

Figure 3:
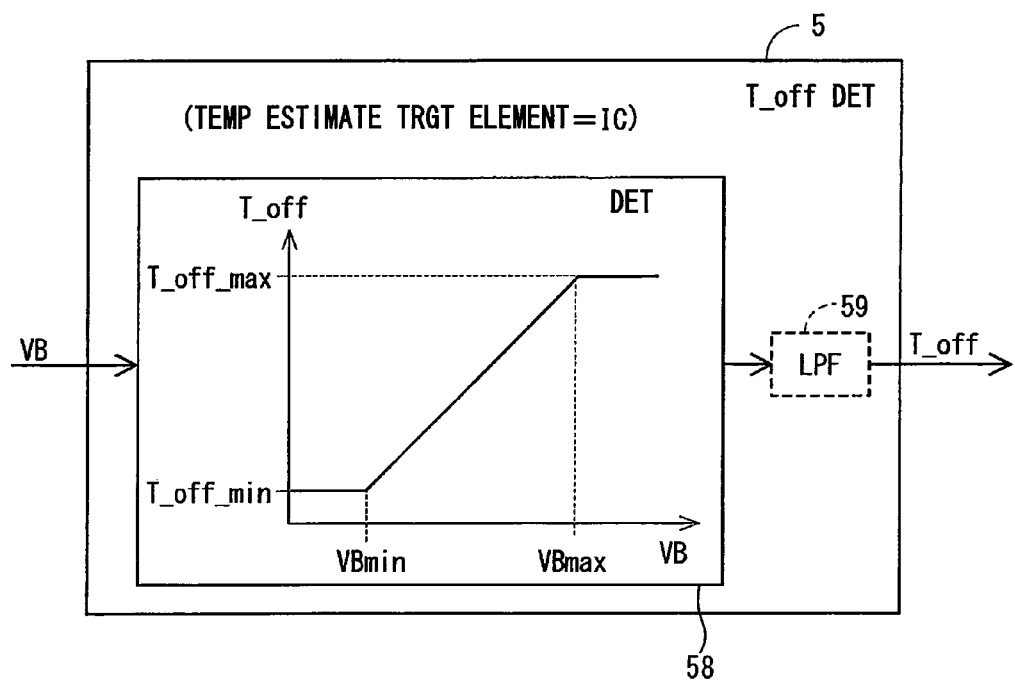
FIG. 3 is a diagram illustrating a supply voltage-offset temperature characteristic by an offset temperature determination portion.
Figure 4:
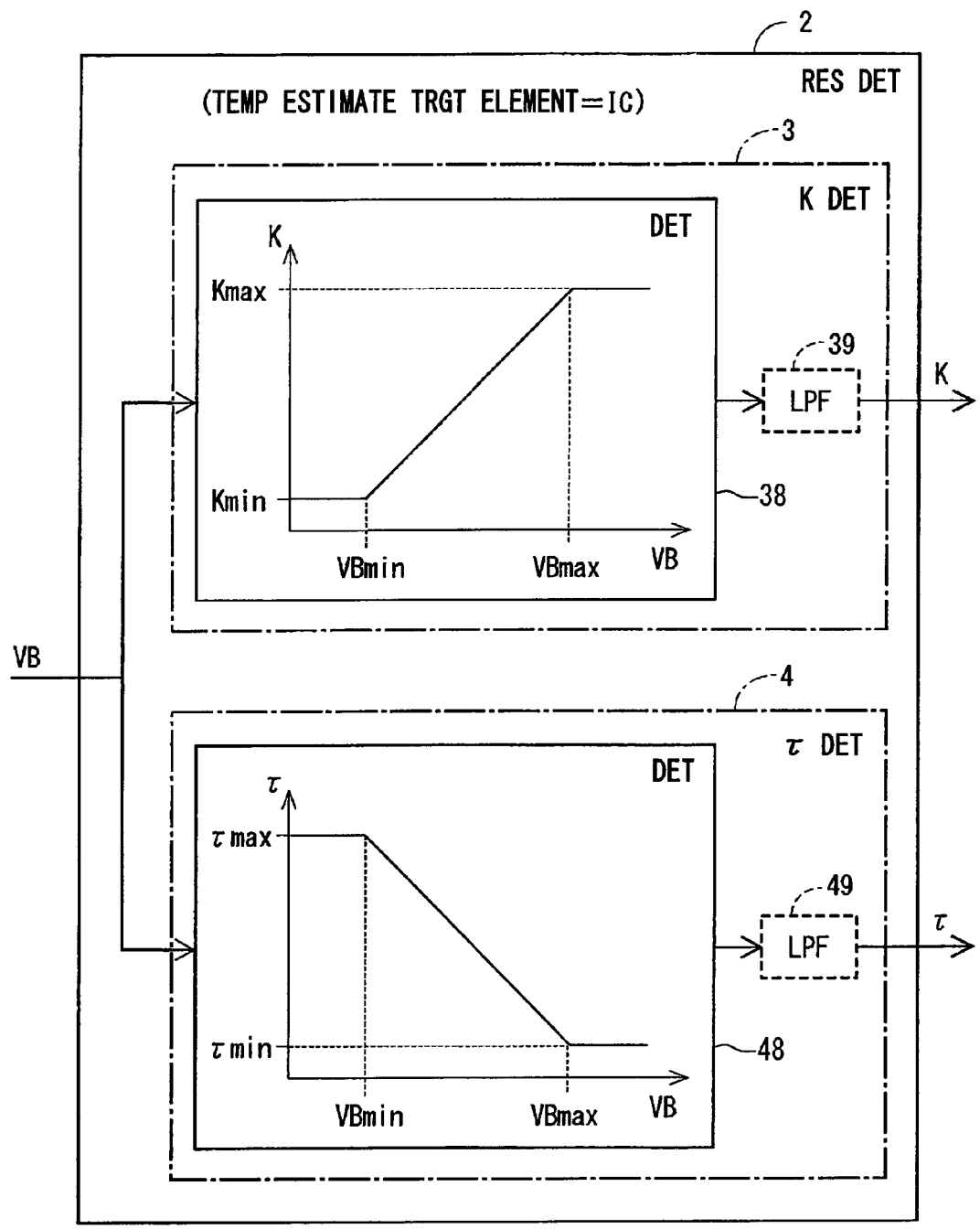
FIG. 4 is a diagram illustrating a supply voltage-gain characteristic and a supply voltage-time constant characteristic by a response constant determination portion when a temperature estimation target element is an IC.
Figure 5:
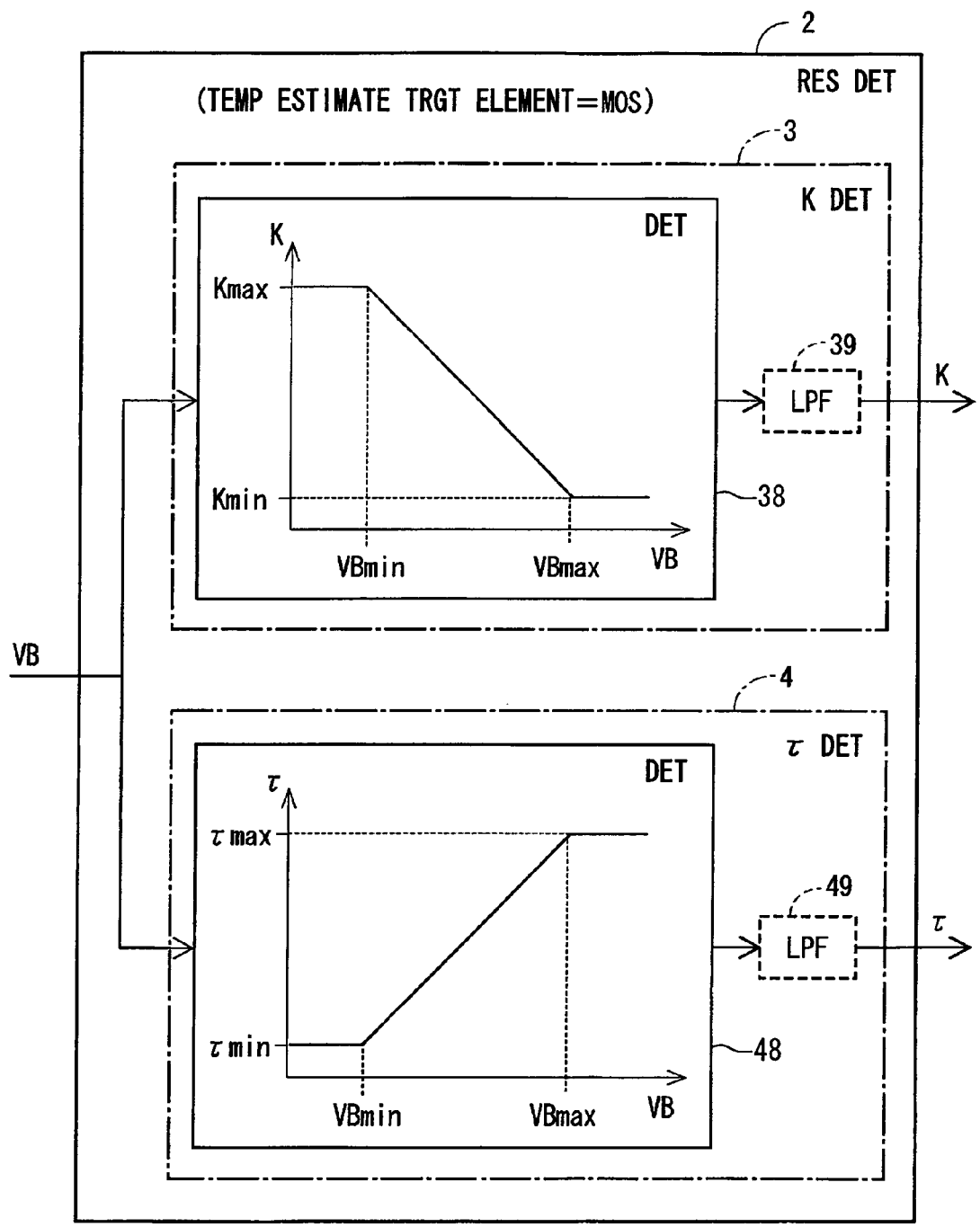
FIG. 5 is a diagram illustrating a supply voltage-gain characteristic and a supply voltage-time constant characteristic by the response constant determination portion when the temperature estimation target element is a MOS.

As illustrated in FIG. 3 to FIG. 5, it may be preferable that each output part of the respective determination units 3, 4, 5 is equipped with a low-pass filter (hereinafter, referred to as LPF). According to this configuration, when the constant is changed by the respective determination units 3, 4, 5, it may be possible to prevent the control from becoming unstable due to a rapid change in the estimated temperature T_est. As long as the constant is smoothly changed, a technique other than the LPF may be applied.

In the first embodiment, the supply voltage VB of the battery 91 is input (applied) to the response constant determination portion 2 and the offset temperature determination portion 5. The response constant determination portion 2 and the offset temperature determination portion 5 determine the gain K, the time constant τ, and the offset temperature T_off according to the supply voltage VB.

As an example of the first embodiment, it is supposed that the temperature estimation target element is the IC 95 or the MOSs 71 to 76. In a configuration example of FIG. 2, the supply voltage VB means the operating supply voltage for the IC 95. The supply voltage VB means the inverter input voltage for the MOSs 71 to 76.

A case in which the temperature estimation target element is the IC 95 will be described with reference to FIG. 3 and FIG. 4.

The IC 95 includes a regulator, and corresponds to a "voltage dependent element" having a power consumption changed according to the supply voltage. The power consumption that is a heat generation factor of the element is generally represented by "$I^2 \times R$" or "$I \times V$ (voltage)". An expression including the voltage of "$I \times V$" is desirable in the voltage dependent element. Thus, with "$I^2 \times R$" as a heat received from the MOS, the heat generation of the IC 95 is represented by "$I^2 \times R + K \times I' \times V = I^2 \times R + T(V)$". Alternatively, the heat generation is presented by "$I^2 \times R(V)$". In this case, it is considered that the resistance is a function changing according to the voltage V. A concept of (a) corresponds to a change in the offset temperature T_off, and a concept of (b) corresponds to a change in the gain K.

A specific example of a configuration for changing the offset temperature T_off will be described with reference to FIG. 3. The offset temperature determination portion 5 sets the offset temperature T_off to be larger as the supply voltage VB is higher from a lower limit value T_off_min to an upper limit value T_off_max, in an effective voltage range from a minimum value VB_min to a maximum value VB_max. The effective voltage range is a voltage range in which the IC 95 can normally operate. The offset temperature determination portion 5 estimates that the heat generation caused by the power consumption of the IC 95 is larger as the supply voltage VB is higher. The determined offset temperature T_off is output through a LPF 59.

A specific example of a configuration for changing the gain K and the time constant τ is illustrated in FIG. 4. The gain determination portion 3 of the response constant determination portion 2 sets the gain K to be larger as the supply voltage VB is higher, in the effective voltage range from a lower limit value Kmin to an upper limit value Kmax. The time constant determination portion 4 sets the time constant τ to be smaller as the supply voltage VB is higher from an upper limit value τmax to a lower limit value τmin, in the effective voltage range. The gain determination portion 3 estimates that the heat generation of the IC 95 is larger and the temperature rise is higher as the supply voltage VB is higher. The determined gain K and the time constant r are output through LPF 39 and LPF 49, respectively.

A case in which the temperature estimation target element is the MOSs 71 to 76 will be described with reference to FIG. 5.

It is supposed that the request torque of the motor 80 is the same. The voltage utilization rate is lowered more as the supply voltage VB that is the input voltage of the inverter 70 is higher. Thus, the DUTY (an on duty of the upper MOS) under the PWM control becomes smaller, and the heat generation has a tendency to be reduced. As illustrated in FIG. 5, the gain determination portion 3 of the response constant determination portion 2 sets the gain K to be smaller as the supply voltage VB is higher in the effective voltage range. The time constant determination portion 4 sets the time constant τ to be larger as the supply voltage VB is higher in the effective voltage range. The gain K and the time constant τ are determined on the basis of a characteristic opposite to that when the temperature estimation target element is the IC 95 (FIG. 4).

(Simulation Result)

A simulation result obtained by comparing the temperature estimation precision between the first embodiment of the present disclosure and the comparative example will be described with reference to FIG. 6.

It is supposed that the supply voltage VB is changed from a low voltage VL to a high voltage VH stepwise. In this case, the simulation compares the estimated temperature between a case in which the offset temperature T_off is fixed (corresponding to the comparative example) and another case in which the offset temperature T_off is changed according to the supply voltage VB (corresponding to the first embodiment of the present disclosure).

Figure 6:
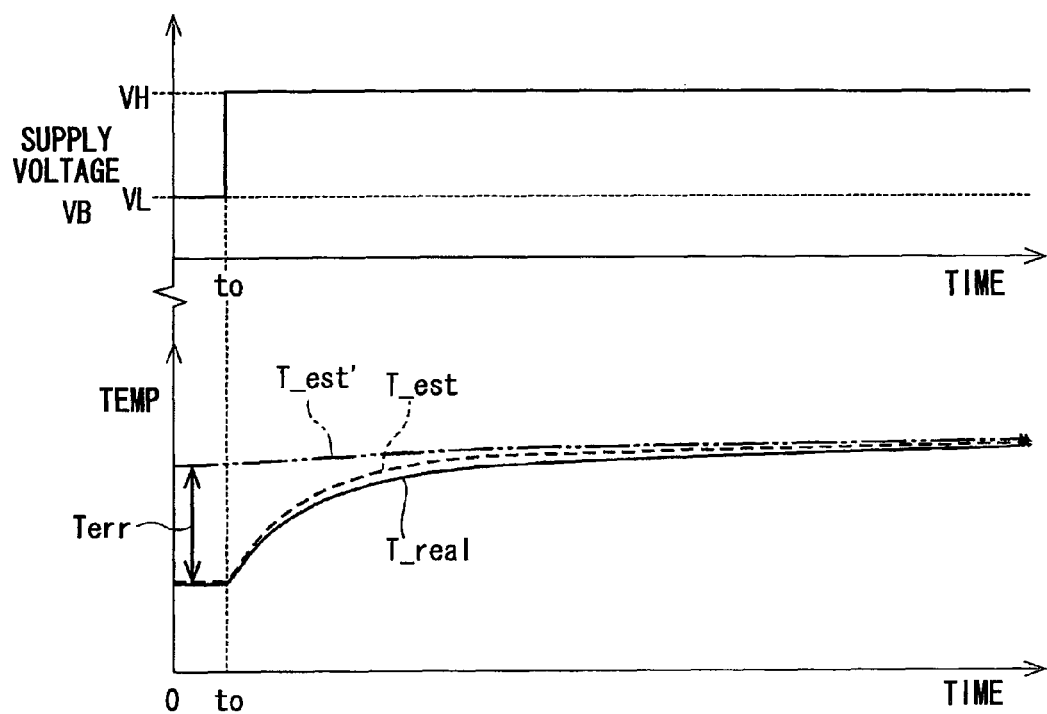
FIG. 6 is a diagram illustrating a simulation result obtained by comparing an estimated temperature of the first embodiment with a comparative example.

FIG. 6 illustrates an estimated temperature T_est' in the comparative example (a two-dot chain line), an estimated temperature T_est (a dashed line) according to the first embodiment of the present disclosure, and a measured temperature T_real (a solid line).

The supply voltage VB is kept at a low voltage VL (for example, 12V) till a time t0, and changes from the low voltage VL to a high voltage VH (for example, 14V) stepwise at the time t0. In the comparative example, since the offset temperature T_off is set assuming the high voltage where the heat generation is large, the offset temperature T_off is excessive at the time of a low voltage before the time t0. Thus, in the estimated temperature T_est', an estimated error Terr is increased on a higher temperature side as compared with a measured temperature T_real.

The estimated temperature T_est according to the present embodiment well matches the measured temperature T_real before the time t0. Even after the supply voltage VB is changed at the time t0, the estimated temperature T_est is changed to follow the measured temperature T_real, and it is found that the temperature estimation precision is improved as compared with the comparative example.

The temperature estimation precision is improved, so that it may be possible that the motor control apparatus 90 according to the first embodiment prevents a current from being always excessively limited on an assumption of a condition of the most severe temperature rise. Thus, it may be possible to effectively exhibit the performance of the motor 80. Also, it may be possible to downsize the heat sink and the MOSs 71 to 76 while the equivalent performance is maintained.

In the second embodiment and the sixth embodiment, it is supposed that the MOSs 71 to 76 are the temperature estimation target elements. In the respective drawings of the second embodiment to the sixth embodiment, substantially the same configurations as those in the embodiment are denoted by identical symbols, and repetitive description will be omitted.

In the second embodiment to a fourth embodiment, the inverter 70 is driven by the PWM control, and modulation is switched between the three-phase modulation and the two-phase modulation by the voltage utilization rate that is calculated according to the requested torque of the motor 80. In this case, in the "duty" that is a rate of the on-time or the off-time to the switching period of the respective MOSs 71 to 76 in the PWM control, "the on-duty of the upper MOSs 71, 72, 73" is written as "DUTY (%)". When a dead time is ignored, the on-duty of the lower MOSs 74, 75, 76 corresponds to "100−DUTY (%)". Incidentally, in another embodiment, a duty, which is a basis of the control, may be appropriately selected.

In the respective control block diagrams of the second to sixth embodiments, as an optional configuration which is settable according to a request, a "motor lock determination portion" is indicated by a dashed line. The motor lock means a state in which the motor 80 does not rotate although the motor 80 is energized. As a method of detecting an energization state, there may be a method of determining that the motor 80 is energized, for example, when a square sum of a dq-axis current, or a q-axis current is not substantially 0. In the motor lock state, the current is concentrated on a specific phase, and the MOS of the phase may excessively generate heat. In this case, accurate temperature estimation is particularly required.

In a state where the motor 80 normally rotates, since the heat generation of each phase is averaged, a necessity preventing the excessive heat generation is relatively low. The characterized temperature estimation according to the respective embodiments may be performed only in a state where the motor 80 is locked, or may be always performed regardless of whether the motor 80 is in the motor lock state.

Second Embodiment

A motor control apparatus according to a second embodiment of the present disclosure will be described with reference to FIG. 7 to FIG. 12.

Figure 7:
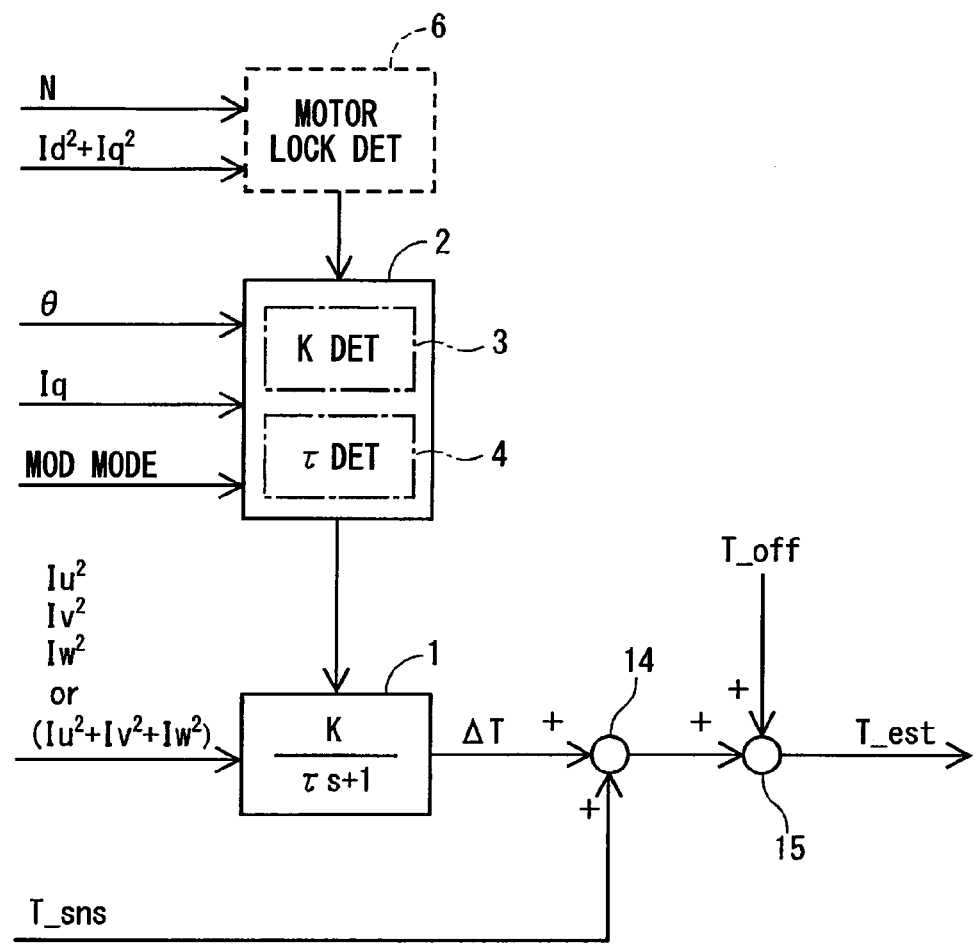
FIG. 7 is a block diagram illustrating a temperature estimation configuration according to a second embodiment.

As illustrated in FIG. 7, the motor control apparatus 90 in the second embodiment includes, as a configuration related to the temperature estimation, a primary delay arithmetic unit 1, a sensor value adder 14, an offset adder 15, a response constant determination portion 2, and a motor lock determination portion 6. The basic configuration is the same as that in the following third to sixth embodiments.

The primary delay arithmetic unit 1 according to the second embodiment receives a square value ($Iu^2$, $Iv^2$, $Iw^2$) of a phase current matching an phase to be estimated, or a time average value (for example, $\Sigma Iu^2/\Delta t$) of its integrated value. The primary delay arithmetic unit 1 calculates a primary delay response using a transmission function of "$K/(\tau s+1)$" for the input phase current square value. In this case, K is a gain, and $\tau$ is a time constant. The combination of the gain K with the time constant $\tau$ is referred to as a "response constant". A phrase that "time constant is changed" means "at least one of the gain K and the time constant $\tau$ is changed".

A power consumption W by energization is represented by "$W=I^2 \times R$" (I: current, R: resistance). The power consumption W is different in transfer amount and speed according to a heat resistance and a heat capacity of the element and a heat radiation unit (a heat sink). Under the circumstances, the heat transfer amount and the transfer speed are reflected on the gain K and the time constant $\tau$, and the primary delay response is calculated whereby the amount of temperature change of the element at t seconds after energization starts is transitionally estimated. The primary delay arithmetic unit 1 outputs the amount of temperature change $\Delta T$ for each phase with an input of the phase current square value or the time average value of the integrated value.

The sensor value adder 14 adds the sensor value T_sns detected by the temperature sensor 96 at the time of starting the energization of the motor 80 to the amount of temperature change $\Delta T$ output by the primary delay arithmetic unit 1. Since it is difficult to measure initial temperatures of the multiple temperature estimation target elements individually, the sensor value T_sns of the temperature sensor 96, for example, disposed to the same substrate is regarded as a temperature corresponding to a heat sink that is a base temperature of the element temperature estimation or the initial temperature of the respective temperature estimation target elements.

The offset adder 15 further adds an offset temperature T_off to an output of the sensor value adder 14, and outputs the added temperature as an estimated temperature T_est.

The response constant determination portion 2 includes a gain determination portion 3 and a time constant determination portion 4, and determines a response constant that is the gain K and the time constant $\tau$ of the primary delay arithmetic unit 1. In this case, an increase in the gain K and a reduction in the time constant r each function to increase the estimated temperature T_est. A reduction in the gain K and an increase in the time constant $\tau$ each function to decrease the estimated temperature T_est. The gain K and the time constant $\tau$ have the reverse characteristics. In the following drawings, a change characteristic of the gain K to a parameter of the response constant is indicated as a representative. A change characteristic of the time constant $\tau$ is interpreted by reversing the change characteristic of the gain K.

Figure 11:
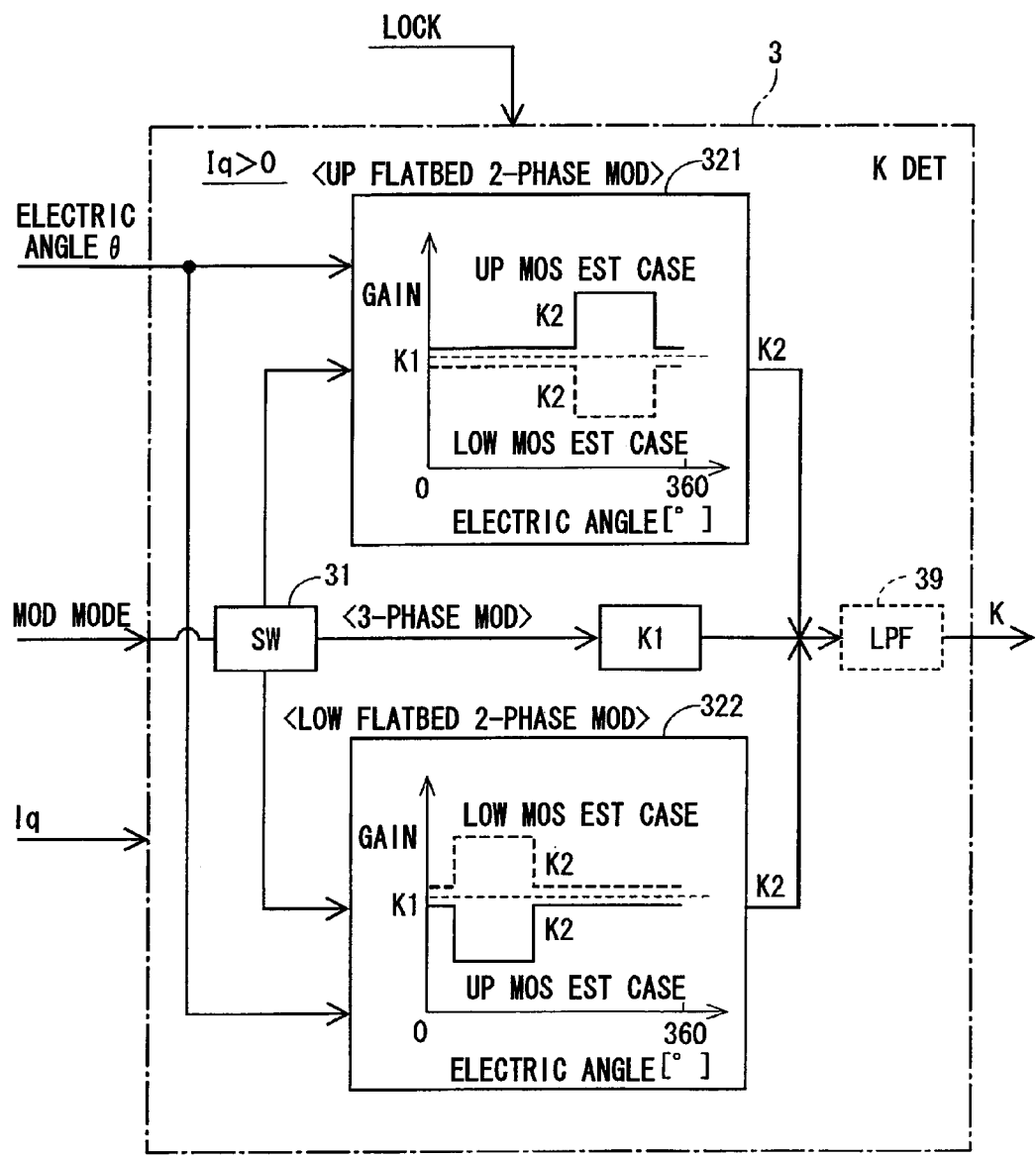
FIG. 11 is a block diagram illustrating the details of a gain determination portion in a case where q-axis current>0, according to the second embodiment.

As illustrated in FIG. 11 and subsequent figures, it may be preferable that each output part of the gain determination portion 3 and the time constant determination portion 4 is provided with a low-pass filter (hereinafter referred to as "LPF"). Accordingly, when the gain K or the time constant $\tau$ is changed by the respective determination units 3 and 4, it may be possible to prevent the control from becoming unstable due to a rapid change in the estimated temperature T_est. As long as the gain K or the time constant is smoothly changed, any technique other than the LPF may be used.

In the second embodiment, the response constant determination portion 2 receives an electric angle $\theta$, a q-axis current Iq, and a modulation mode. The response constant determination portion 2 classifies the q-axis current Iq into positive and negative, and classifies the modulation mode into the three-phase modulation and the two-phase modulation. The response constant determination portion 2 determines the gain K and the time constant $\tau$ according to the electric angle $\theta$.

The motor lock determination portion 6 receives a motor rotation speed N and a dq-axis current square sum. The motor rotation speed N is calculated on the basis of an electric angle velocity $\omega$ obtained by differentiating the electric angle 9 with time. Alternatively, the electric angle velocity $\omega$ may be treated as the rotation speed as it is.

The motor lock determination portion 6 determines a state in which the motor 80 does not rotate although the motor 80 is energized as a motor lock state. For example, when the motor rotation speed N is substantially 0, and the dq-axis current square sum is not substantially 0, the motor lock determination portion 6 determines that the motor 80 is in the lock state.

The response constant determination portion 2 determines the gain K and the time constant $\tau$ at least when the motor 80 is in the lock state, through a method to be described later. When the motor 80 is not in the lock state, the response constant determination portion 2 may set the gain K and the time constant $\tau$ as fixed values, similar to the comparative example.

Waveforms of respective phase voltage command signals Du, Dv, Dw in the three-phase modulation and the two-phase modulation of the PWM control are illustrated in FIG. 8A to FIG. 10.

Figure 8A:
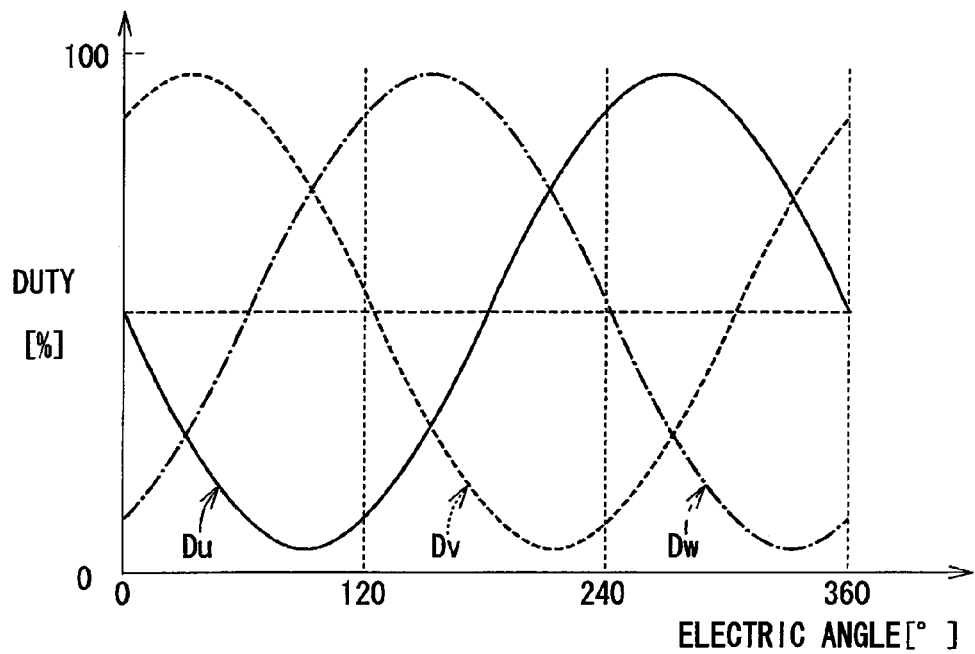
FIG. 8A is a diagram illustrating a waveform of three-phase modulation when q-axis current>0.
Figure 8B:
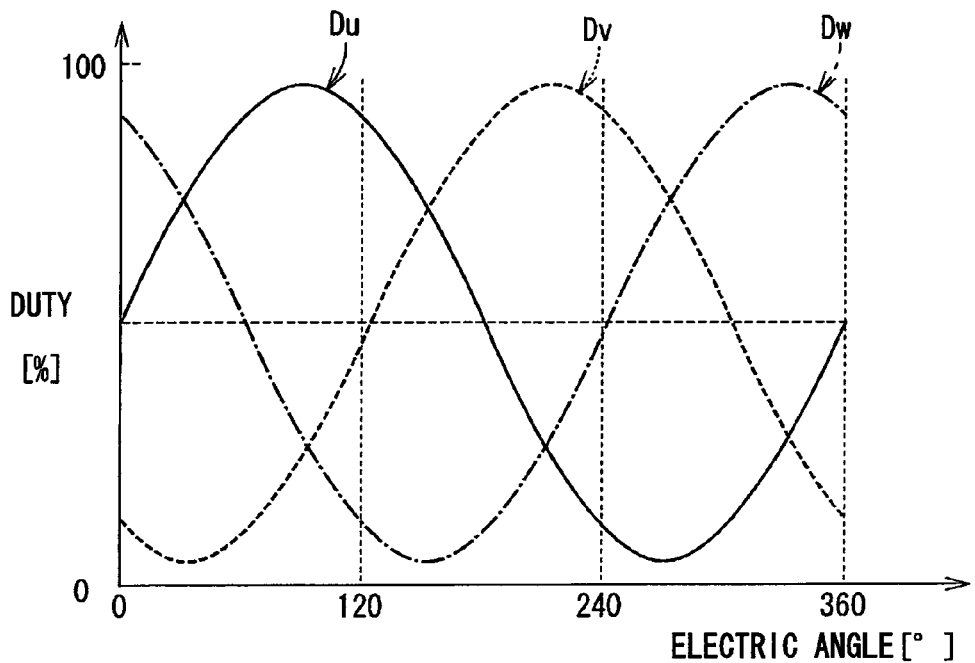
FIG. 8B is a diagram illustrating a waveform of three-phase modulation when q-axis current<0.

As illustrated in FIG. 8A and FIG. 8B, in the three-phase modulation, the respective phase voltage command signals Du, Dv, Dw change substantially in a sine wave shape. The respective phase voltage command signals Du, Dv, Dw are reversed in positive and negative between when the q-axis current Iq is positive (Iq>0) shown in FIG. 8A and when the q-axis current Iq is negative (Iq<0) shown in FIG. B. For example, in the electric power steering device, the positive and negative of the q-axis current correspond to a steering direction.

Figure 9:
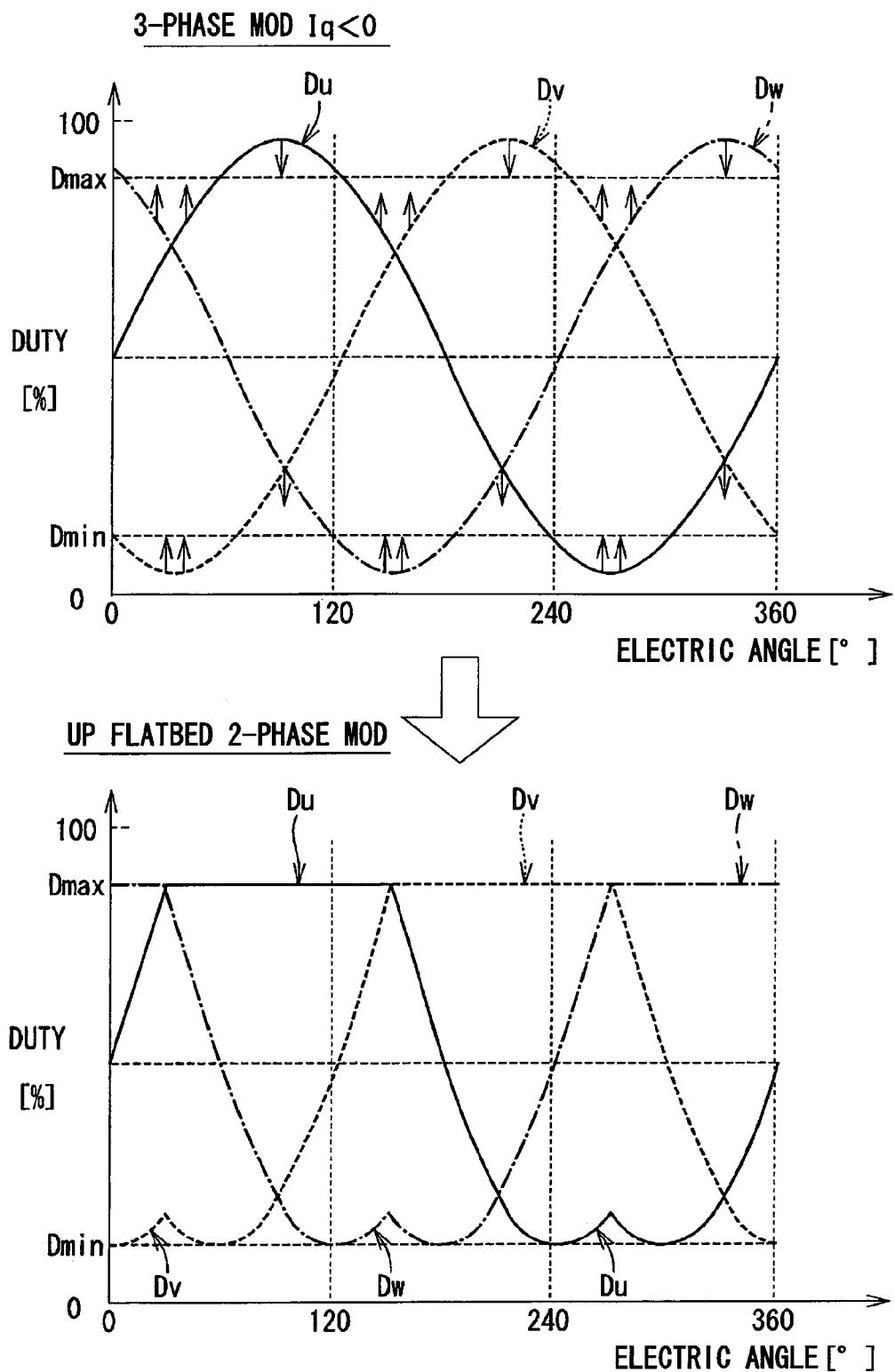
FIG. 9 is a diagram illustrating a waveform of an upper flatbed two-phase modulation.
Figure 10:
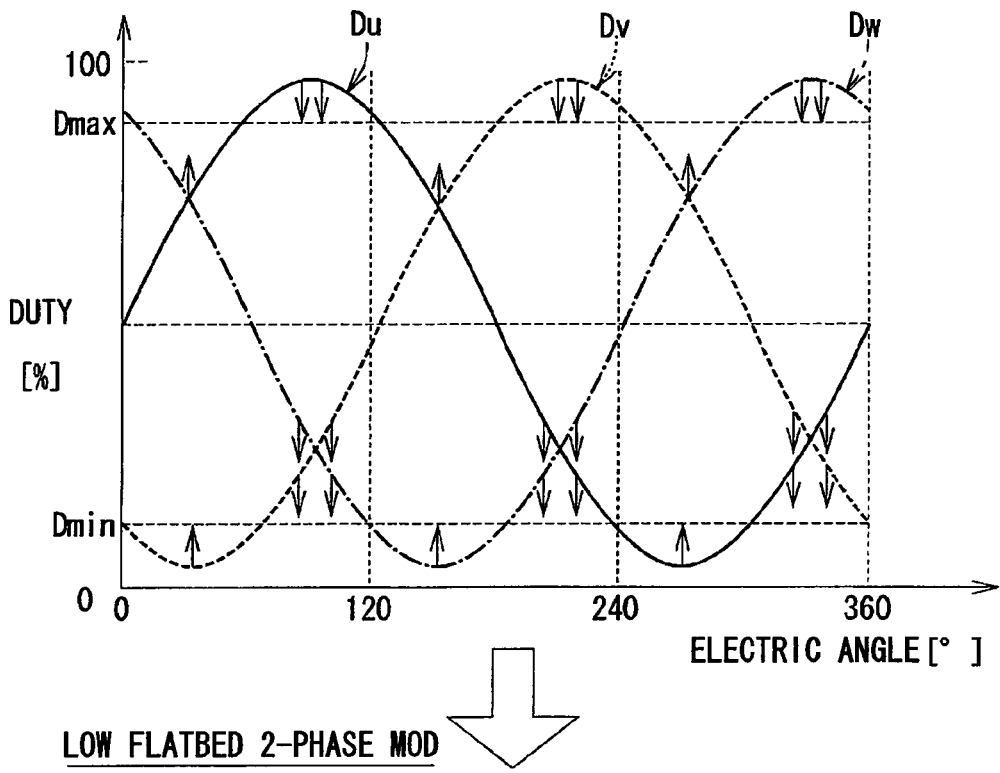
FIG. 10 is a diagram illustrating a waveform of a lower flatbed two-phase modulation.
Figure 10:
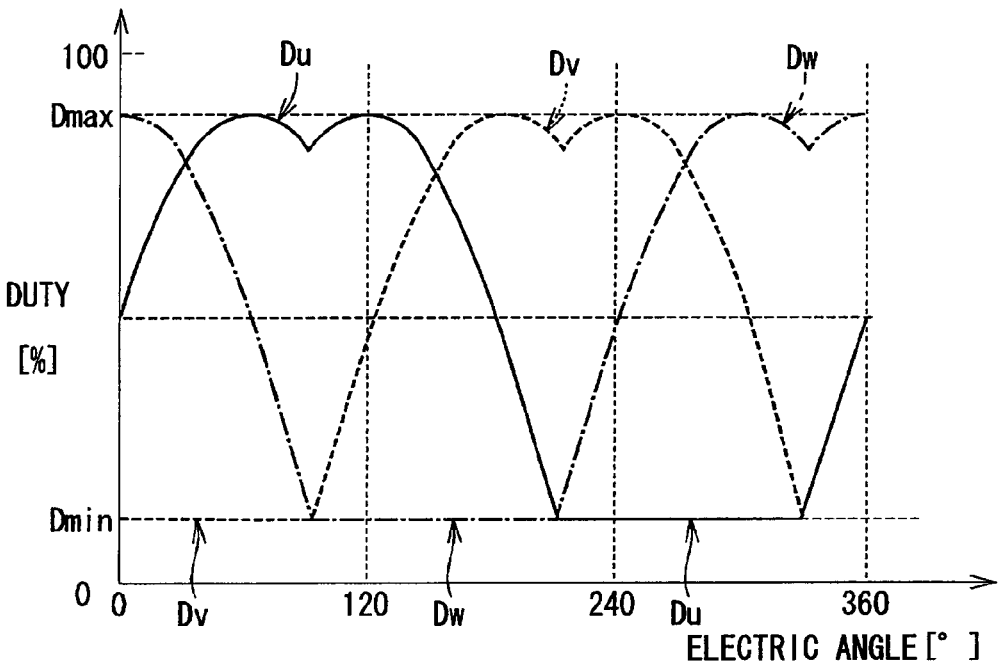

Waveforms of an upper flatbed two-phase modulation and a lower flatbed two-phase modulation when the q-axis current Iq is negative (Iq<0) are illustrated in FIG. 9 and FIG. 10, respectively. The waveforms when the q-axis current Iq is positive (Iq>0) correspond to upside-down waveforms of FIG. 9 and FIG. 10. The "upper flatbed two-phase modulation" and the "lower flatbed two-phase modulation" are disclosed in, for example, JP 5045799 B2.

As illustrated in FIG. 9, the "upper flatbed two-phase modulation" is a modulation process for subtracting a value that is obtained by subtracting a predetermined upper limit value Dmax from the largest voltage command signal of the phase, from the voltage command signals of all phases, so that the largest voltage command signal in the voltage command signals Du, Dv, Dw of three phases becomes the predetermined upper limit value Dmax.

As illustrated in FIG. 10, the "lower flatbed two-phase modulation" is a modulation process for subtracting a value that is obtained by subtracting a predetermined lower limit value Dmin from the smallest voltage command signal of the phase, from the voltage command signals of all phases, so that the smallest voltage command signal in the voltage command signals Du, Dv, Dw of three phases becomes the predetermined lower limit value Dmin.

A configuration of the gain determination portion 3 according to the second embodiment will be described with reference to FIG. 11 and FIG. 12.

The gain determination portion 3 includes a switch 31, an upper flatbed two-phase modulation map 321 and a lower flatbed two-phase modulation map 322, which are created for each phase, and an LPF 39.

The switch 31 switches a processing that determines the gain K to another according to a modulation mode. When the modulation mode is the three-phase modulation, the gain determination portion 3 sets the gain K to K1 (a reference value) regardless of the electric angle θ. When the modulation mode is the upper flatbed two-phase modulation, the gain determination portion 3 determines a gain K2 with referring to the upper flatbed two-phase modulation map 321. When the modulation mode is the lower flatbed two-phase modulation, the gain determination portion 3 determines the gain K2 with referring to the lower flatbed two-phase modulation map 322. The determined gain K1 or the determined gain K2 is output through the LPF 39. Incidentally, when the modulation mode is the three-phase modulation, the gain K1 may be a map for the electric angle and may not be a fixed value. In this case, the gain K1 is set to, for example, a map matching a difference in power consumption between the rotating state and the lock state.

According to the upper flatbed two-phase modulation map 321, in an electric angle range where the DUTY is fixed to the upper limit value Dmax, the gain K increases up to the gain K2 that is larger than the gain K1 stepwise at the time of the upper MOS estimation, and decreases down to the gain K2 that is smaller than the gain K1 stepwise at the time of the lower MOS estimation.

According to the lower flatbed two-phase modulation map 322, in an electric angle range where the DUTY is fixed to the lower limit value Dmin, the gain K decreases down to the gain K2 that is smaller than the gain K1 stepwise at the time of the upper MOS estimation, and increases up to the gain K2 that is larger than the gain K1 stepwise at the time of the lower MOS estimation.

The gain K2 is set to be a value larger than K1 in the electric angle range where the heat generation is considered to be maximum when the on-time of the temperature estimated MOS is longest, and the gain K2 is set to be a value smaller than K1 in the electric angle range where the heat generation is considered to be minimum when the off-time of the temperature estimated MOS is longest. The temperature estimated MOS means a MOS whose temperature is to be estimated.

According to this configuration, since the temperature is estimated for each of the upper MOS and the lower MOS for each phase taking the modulation mode into consideration, it may be possible to improve the temperature estimation precision.

The motor control apparatus 90 in the second embodiment is caused to improve the temperature estimation precision. Thus, it may be possible to prevent a current from being always excessively limited on the assumption of a condition of the most severe temperature rise. Therefore, it may be possible to effectively exhibit the performance of the motor 80. In addition, it may be possible to downsize the heat sink and the MOSs 71 to 76 while the equivalent performance is maintained.

The effects are common in the following third to sixth embodiments.

Third Embodiment

A third embodiment of the present disclosure will be described with reference to FIG. 13 to FIG. 18B.

Figure 13:
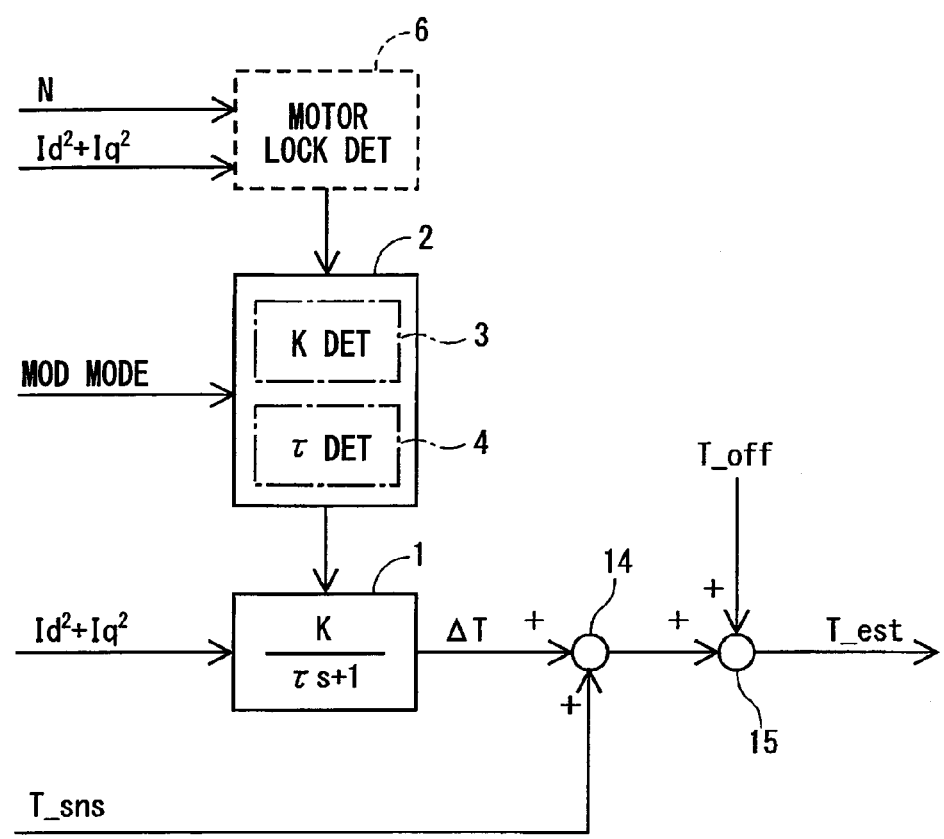
FIG. 13 is a block diagram illustrating a temperature estimation configuration according to a third embodiment.

As illustrated in FIG. 13, a square value sum ($Id^2+Iq^2$) of a dq-axis current is input to a primary delay arithmetic unit 1 according to a third embodiment instead of the phase current of the second embodiment. The primary delay arithmetic unit 1 calculates a primary delay response using a transmission function of "$K/(\tau s+1)$" for an integrated value of the dq-axis current square value. Only the modulation mode is input to a response constant determination portion 2 according to the third embodiment. In other words, in the third embodiment, the temperature of an upper MOS and a lower MOS, not for each phase, but encompassing three phases is estimated. A gain K and a time constant τ used for the primary delay calculation does not depend on the positive and negative of a q-axis current Iq and an electric angle θ.

Figure 14:
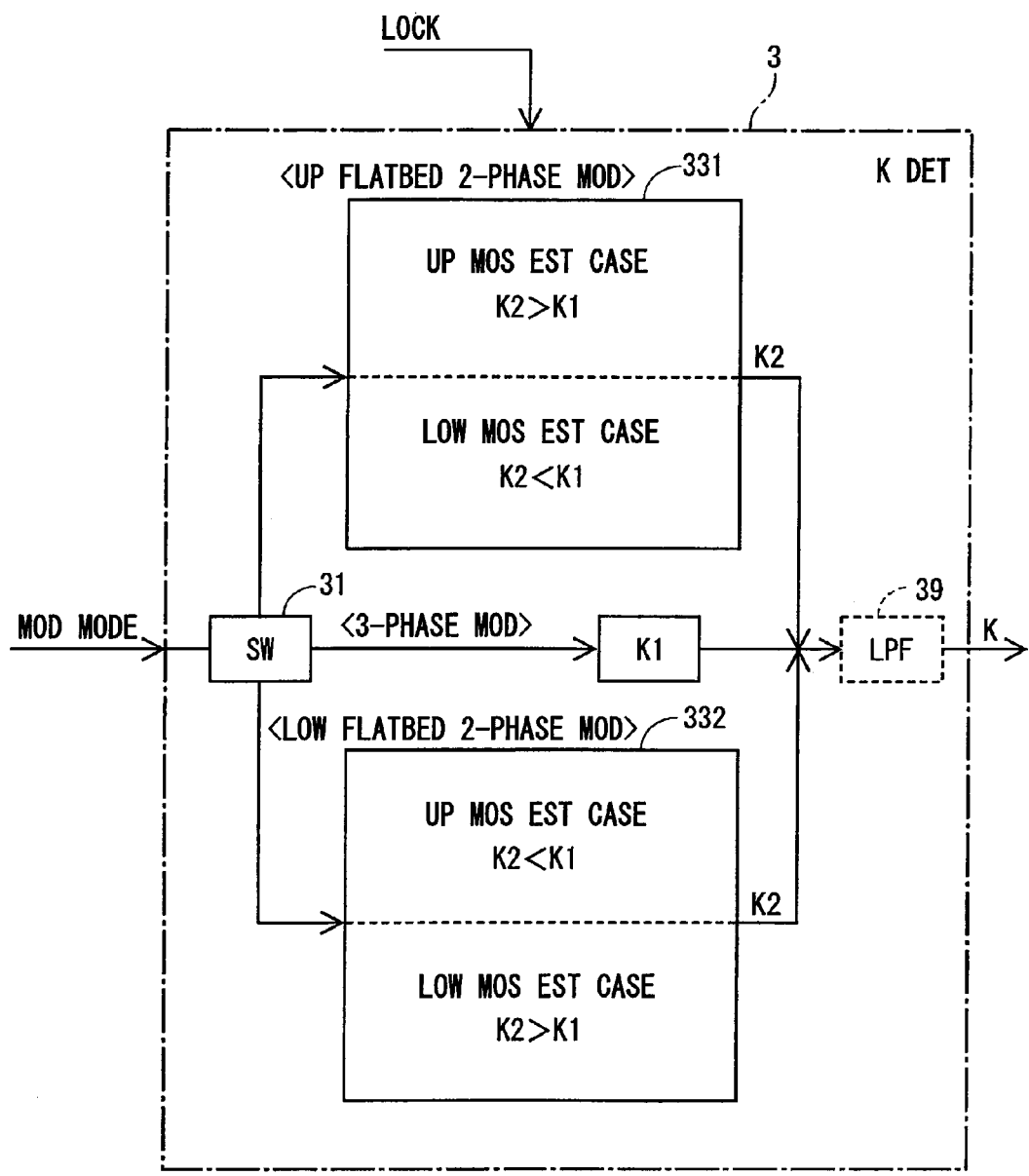
FIG. 14 is a block diagram illustrating the details of a gain determination portion according to the third embodiment.

As illustrated in FIG. 14, the gain determination portion 3 according to the third embodiment includes a switch 31, an upper flatbed two-phase modulation map 331, a lower flatbed two-phase modulation map 332, and an LPF 39.

The switch 31 switches a setting route of the gain K to another by the modulation mode. Similar to the case of the second embodiment, when the modulation mode is the three-phase modulation, the gain determination portion 3 sets the gain K to a gain K1 (a reference value) regardless of the electric angle θ. When the modulation mode is the upper flatbed two-phase modulation, the gain determination portion 3 determines a gain K2 with reference to the upper flatbed two-phase modulation map 331. When the modulation mode is the lower flatbed two-phase modulation, the gain determination portion 3 determines the gain K2 with reference to the lower flatbed two-phase modulation map 332. The determined gain K1 or the gain K2 is output through the LPF 39.

According to the upper flatbed two-phase modulation map 331, the gain K2 larger than the gain K1 is determined at the time of the upper MOS estimation, and the gain K2 smaller than the gain K1 is determined at the time of the lower MOS estimation.

According to the lower flatbed two-phase modulation map 332, the gain K2 smaller than the gain K1 is determined at the time of the upper MOS estimation, and the gain K2 larger than the gain K1 is determined at the time of the lower MOS estimation.

It is supposed that the three-phase upper MOSs are dealt with as a MOS group and the three-phase lower MOSs are dealt with as another MOS group. When the heat generation is considered to increase when an average on-time of the temperature estimated MOS group is longer than that at the time of the three-phase modulation, the gain K2 is set to be larger than the gain K1. When the heat generation is considered to decrease when an average off-time of the temperature estimated MOS group is longer than that at the time of the three-phase modulation, the gain K2 is set to be smaller than the gain K1. Incidentally, the temperature estimated MOS group means a MOS group that the temperature is estimated.

According to this configuration, since the temperature is estimated for each group of the three-phase upper MOS and the three-phase lower MOS taking the modulation mode into consideration, it may be possible to improve the temperature estimation precision with smaller calculation load.

Modified Example

Figure 15:
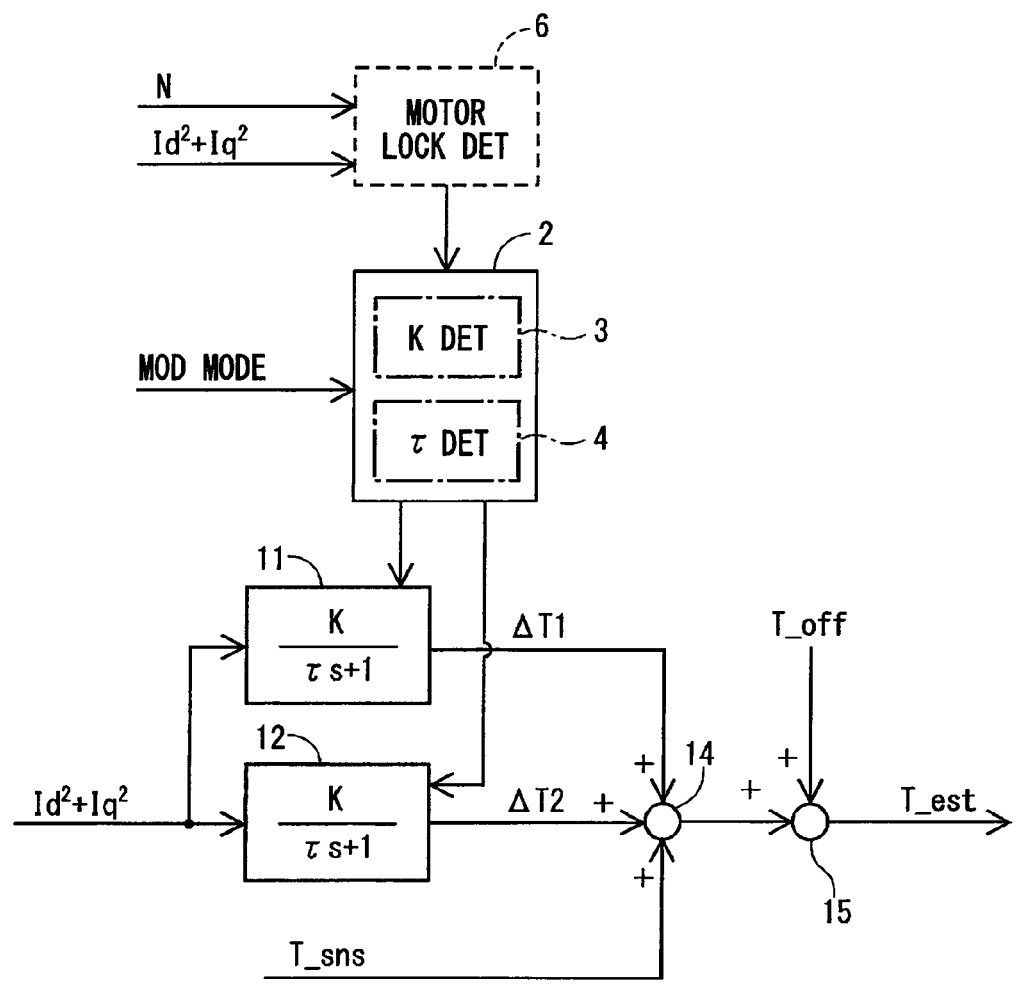
FIG. 15 is a block diagram illustrating a temperature estimation configuration according to a modified example of the third embodiment.

In the configuration of the temperature estimation, the primary delay arithmetic unit is not limited to one unit, but multiple primary delay arithmetic units may be disposed. For example, a configuration in which two primary delay arithmetic units are provided for the temperature estimation configuration of FIG. 13 is illustrated in FIG. 15. In this example, the amount of a temperature change ΔT1, ΔT2 respectively calculated in two primary delay arithmetic units 11, 12 is input to a sensor value adder 14 for addition. Three or more primary delay arithmetic units may be provided. Similarly, multiple primary delay arithmetic units may be provided in the temperature estimation configuration of another embodiment.

(Simulation Result)

A simulation result obtained by comparing the temperature estimation precision between the third embodiment of the present disclosure and the comparative example will be described with reference to FIG. 16 to FIG. 18B.

When the modulation mode of the PWM control switches from the three-phase modulation mode to the lower flatbed two-phase modulation mode during the motor rotation stop (when the motor is locked), the simulation compares the estimated temperatures of the upper MOS and the lower MOS between when the gain K of the primary delay arithmetic unit 1 is fixed (corresponding to a case of a comparative example) and when the gain K is changed according to the modulation mode (corresponding to a case of the third embodiment of the present disclosure).

Figure 16:
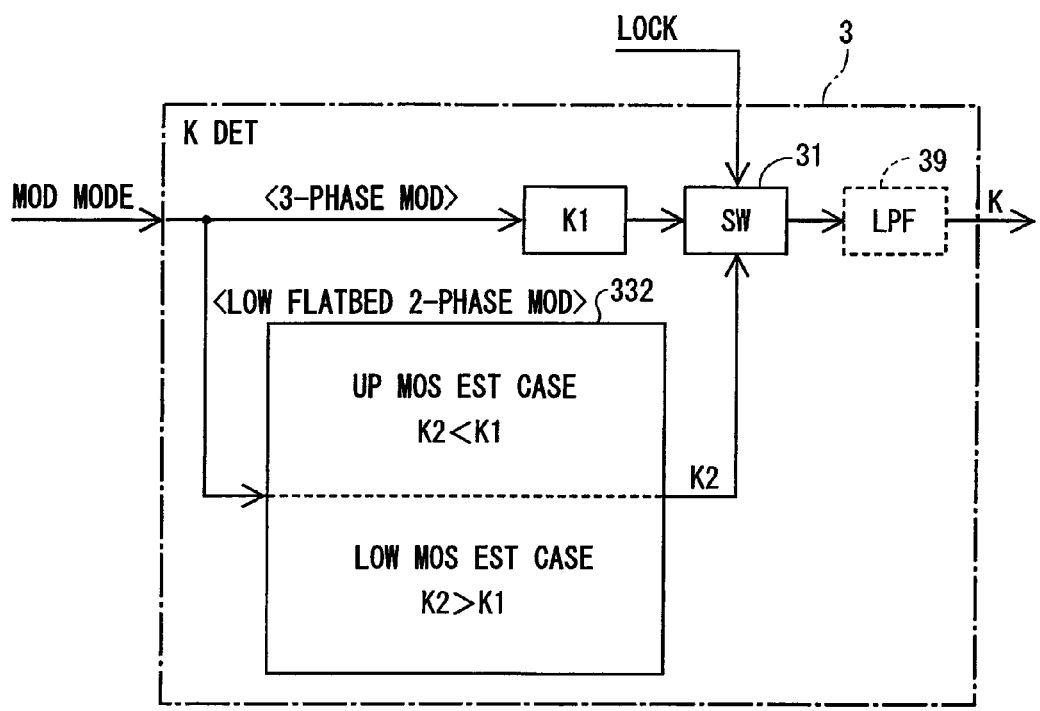
FIG. 16 is a block diagram illustrating the details of the gain determination portion used in a simulation.

A configuration of the gain determination portion 3 used in the simulation is illustrated in FIG. 16. In the simulation, the switch 31 of the gain K is disposed in the rear of the lower flatbed two-phase modulation map 332 in the configuration of FIG. 14. The gain K1 at the time of the three-phase modulation is used when the motor is not locked. As described above, when the time constant τ is changed instead of the gain K, a magnitude relationship between the gain K2 and the gain K1 is set to reverse for the gain map.

Figure 17A:
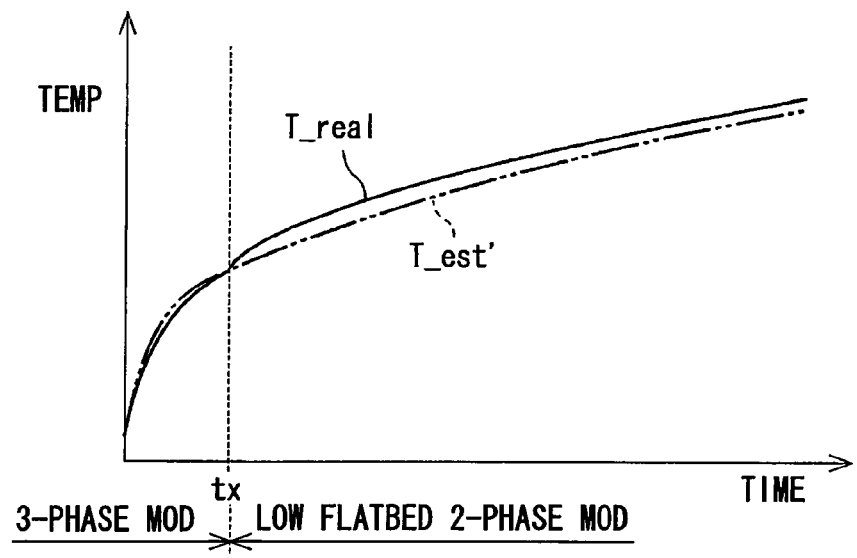
FIG. 17A is a diagram illustrating a simulation result in a case of a lower MOS estimation according to a comparative example.
Figure 17B:
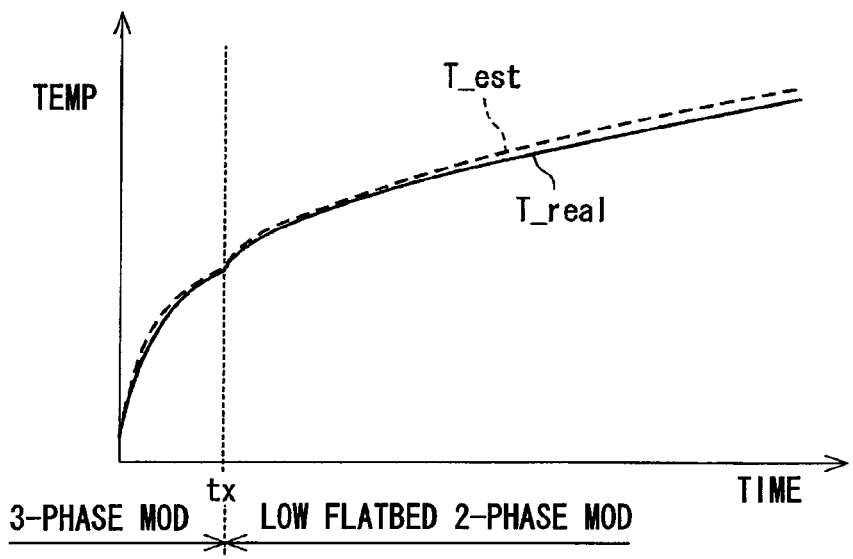
FIG. 17B is a diagram illustrating a simulation result in a case of a lower MOS estimation according to the third embodiment.
Figure 18A:
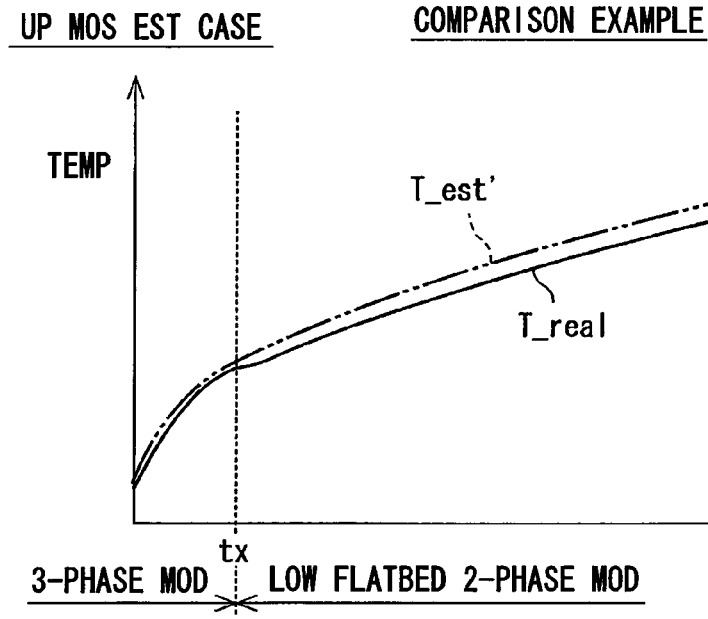
FIG. 18A is a diagram illustrating a simulation result in a case of an upper MOS estimation according to a comparative example.
Figure 18B:
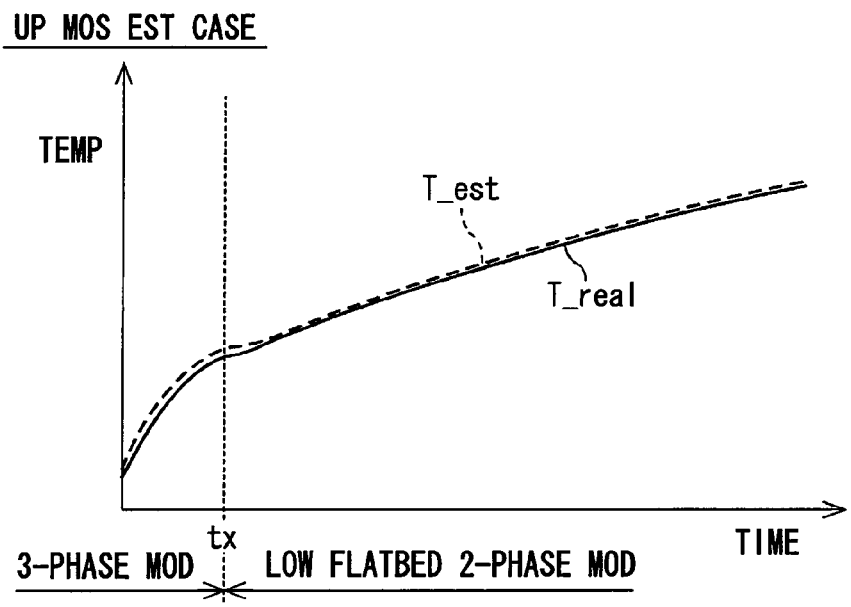
FIG. 18B is a diagram illustrating a simulation result in a case of an upper MOS estimation according to the third embodiment.

FIG. 17A and FIG. 17B illustrate the lower MOS. FIG. 18A and FIG. 18B illustrate the upper MOS. FIG. 17A and FIG. 18A illustrate an estimated temperature T_est' (a two-dot chain line) in the comparative example. FIG. 17B and FIG. 18B illustrate an estimated temperature T_est (a dashed line) according to the third embodiment of the present disclosure. In FIG. 17A to FIG. 18B, a measured temperature T_real is illustrated by a solid line.

At the time of the three-phase modulation before a time tx, the estimated temperatures T_est' and T_est match the measured temperature T_real in both of the comparative example and the third embodiment of the present disclosure.

It is supposed that the modulation mode changes from the three-phase modulation to the two-phase modulation at the time tx. In this case, the measured temperature T_real of the lower MOS (FIG. 17A and FIG. 17B) rises as compared with a rising curve of the three-phase modulation since the on-time of the lower MOS of the phase on which the current is concentrated by locking becomes longer than that in the three-phase modulation to increase the heat generation. By contrast, the measured temperature T_real of the upper MOS (FIG. 18A and FIG. 18B) is lowered as compared with the rising curve of the three-phase modulation since the off-time of the corresponding upper MOS becomes shorter than that in the three-phase modulation to decrease the heat generation.

In the comparative example in which the gain K is fixed regardless of the modulation mode, the estimated temperature T_est' is deviated from the measured temperature T_real in both of the lower MOS and the upper MOS. In the third embodiment of the present disclosure in which the gain K is changed according to the modulation mode, it is found that the estimated temperature Test is changed to follow the measured temperature T_real, and the temperature estimation precision is improved.

Fourth Embodiment

In a fourth embodiment of the present disclosure, only differences from the third embodiment will be described with reference to FIG. 19 and FIG. 20.

Figure 19:
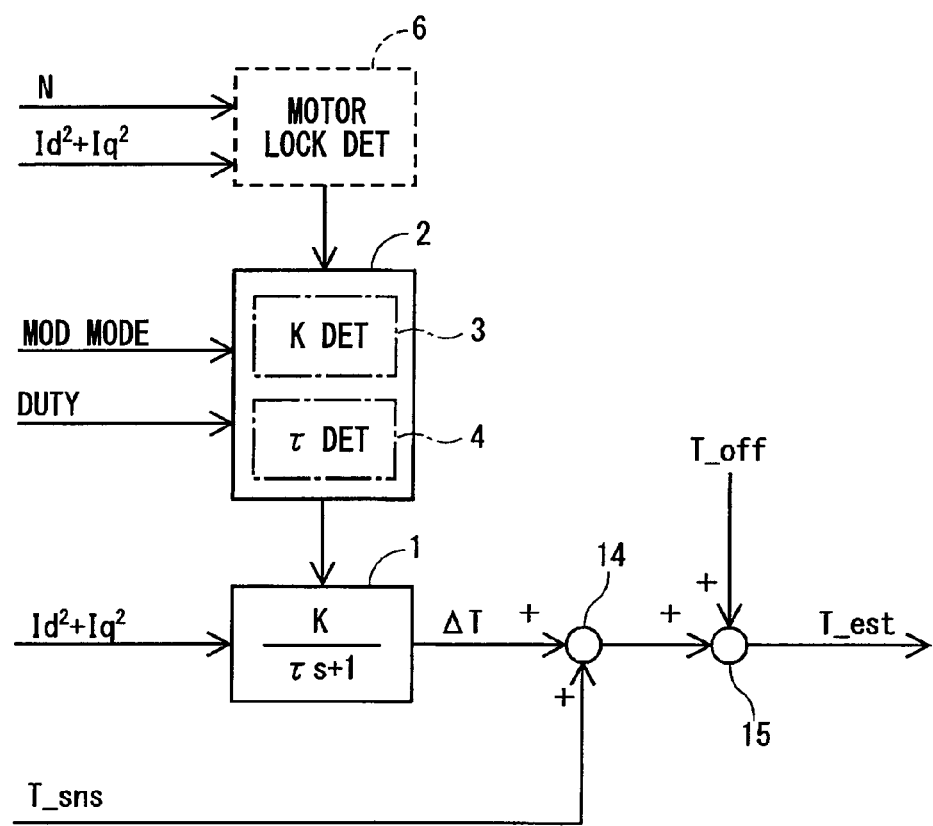
FIG. 19 is a block diagram illustrating a temperature estimation configuration according to a fourth embodiment.

As illustrated in FIG. 19, similar to the third embodiment, a primary delay arithmetic unit 1 according to the fourth embodiment receives a square value sum $(Id^2+Iq^2)$ of a dq-axis current. A response constant determination portion 2 according to the fourth embodiment receives a modulation mode and the DUTY. The fourth embodiment performs the temperature estimation taking a change in the DUTY into consideration in addition to the "temperature estimation of the three-phase upper MOS group and the three-phase lower MOS group according to the modulation mode" according to the third embodiment.

Figure 20:
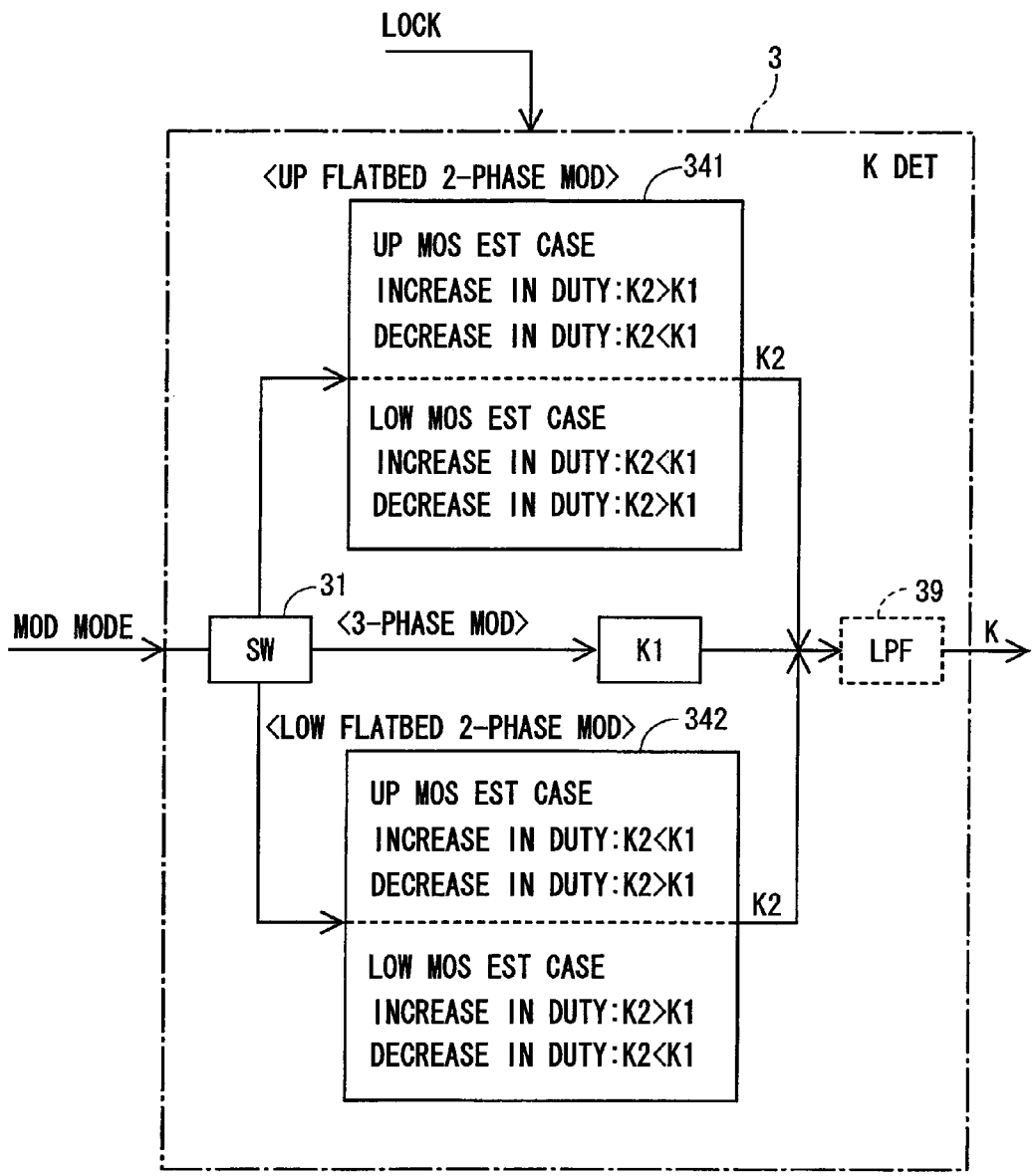
FIG. 20 is a block diagram illustrating the details of a gain determination portion according to the fourth embodiment.

As illustrated in FIG. 20, a gain determination portion 3 according to the fourth embodiment includes a switch 31, an upper flatbed two-phase modulation map 341, a lower flatbed two-phase modulation map 342, and an LPF 39.

According to the upper flatbed two-phase modulation map 341, at the time of the upper MOS estimation, the gain K2 larger than the gain K1 is determined when the DUTY increases. The gain K2 smaller than the gain K1 is determined when the DUTY decreases. At the time of the lower MOS estimation, the gain K2 smaller than the gain K1 is determined when the DUTY increases. The gain K2 larger than the gain K1 is determined when the DUTY decreases.

According to the lower flatbed two-phase modulation map 342, at the time of the upper MOS estimation, the gain K2 smaller than the gain K1 is determined when the DUTY increases. The gain K2 larger than the gain K1 is determined when the DUTY decreases. At the time of the lower MOS estimation, the gain K2 larger than the gain K1 is determined when the DUTY increases. The gain K2 smaller than the gain K1 is determined when the DUTY decreases.

In this example, when the DUTY is fixed to the upper limit value Dmax or the lower limit value Dmin, and the DUTY keeps constant, the gain may be included in any one of increase and decrease, or "K2=K1" may be set.

For example, at the time of the upper MOS estimation in the upper flatbed two-phase modulation, or at the time of the lower MOS estimation in the lower flatbed two-phase modulation, when the DUTY increases, the gain K2 is set to be larger than the gain K1 since the heat generation becomes larger in future. When the DUTY decreases, the gain K2 is set to be smaller than the gain K1 since the heat generation becomes small in future. At the time of the lower MOS estimation in the upper flatbed two-phase modulation, or at the time of the upper MOS estimation in the lower flatbed two-phase modulation, the gain is reverse.

According to this configuration, as compared with the third embodiment, since the temperature is estimated for each group of the three-phase upper MOS and the three-phase lower MOS further taking the DUTY change into consideration, it may be possible to improve the temperature estimation precision.

Fifth Embodiment

A fifth embodiment of the present disclosure will be described with reference to FIG. 21 to FIG. 23. In the fifth embodiment, a difference in heat generation caused by a difference in a heat resistance or a heat capacity of hardware for each phase in a three-phase inverter 70, in detail, a difference (variation) in the heat resistance or the heat capacity related to heat radiation from a junction of the MOS to a heat sink is considered.

Figure 21:
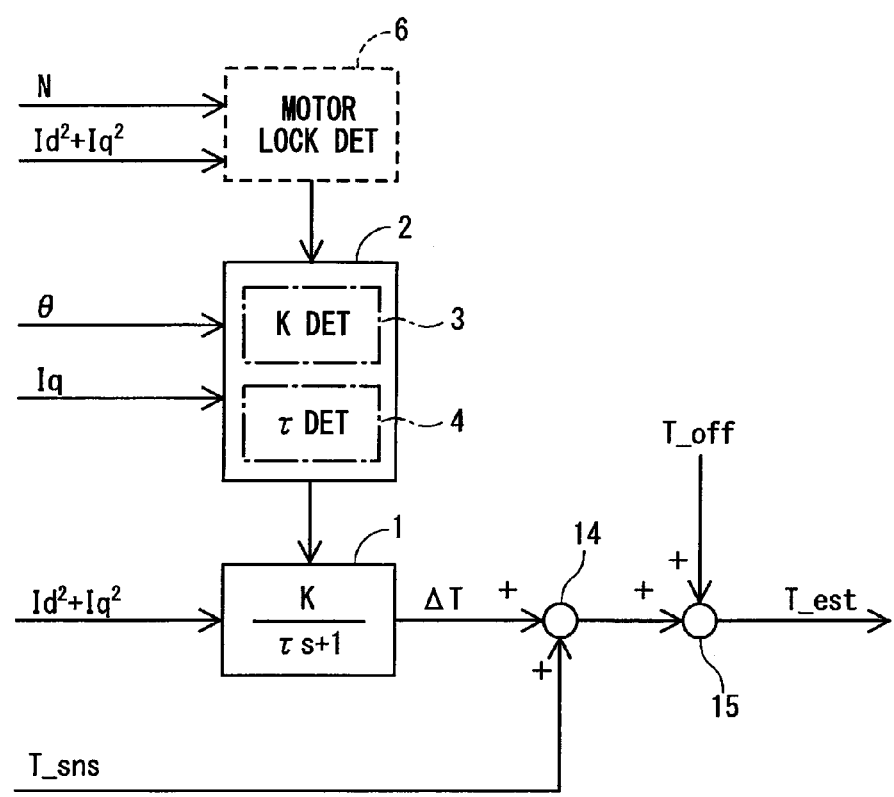
FIG. 21 is a block diagram illustrating a temperature estimation configuration according to a fifth embodiment and a sixth embodiment.

As illustrated in FIG. 21, a primary delay arithmetic unit 1 according to the fifth embodiment receives a square value sum $(Id^2+Iq^2)$ of a dq-axis current. The primary delay arithmetic unit 1 calculates a primary delay response using a transmission function of "$K/(\tau s+1)$" for an input dq-axis current square value sum. In the fifth embodiment, a response constant determination portion 2 receives the electric angle θ and the q-axis current Iq.

In the fifth embodiment, weighting reflecting a difference in the heat resistance or the heat capacity of hardware at the electric angle θ in which a current amplitude of each phase is maximum is conducted on the respective positive and negative of the q-axis current Iq for the three-phase upper MOS group or the three-phase lower MOS group to estimate the temperature.

A detailed configuration of the gain determination portion 3 according to the fifth embodiment will be described with reference to FIG. 22 and FIG. 23.

A gain determination portion 3 includes a switch 31, an upper MOS estimation map 351, a lower MOS estimation map 352, and an LPF 39. The upper MOS estimation map 351 and the lower MOS estimation map 352 define a relationship of the gain K to an electric angle θ.

In each of the upper MOS estimation map 351 and the lower MOS estimation map 352, two maps upside-down between a case where a q-axis current Iq is positive (Iq>0) and a case where the q-axis current Iq is negative (Iq<0) are set.

Figure 22:
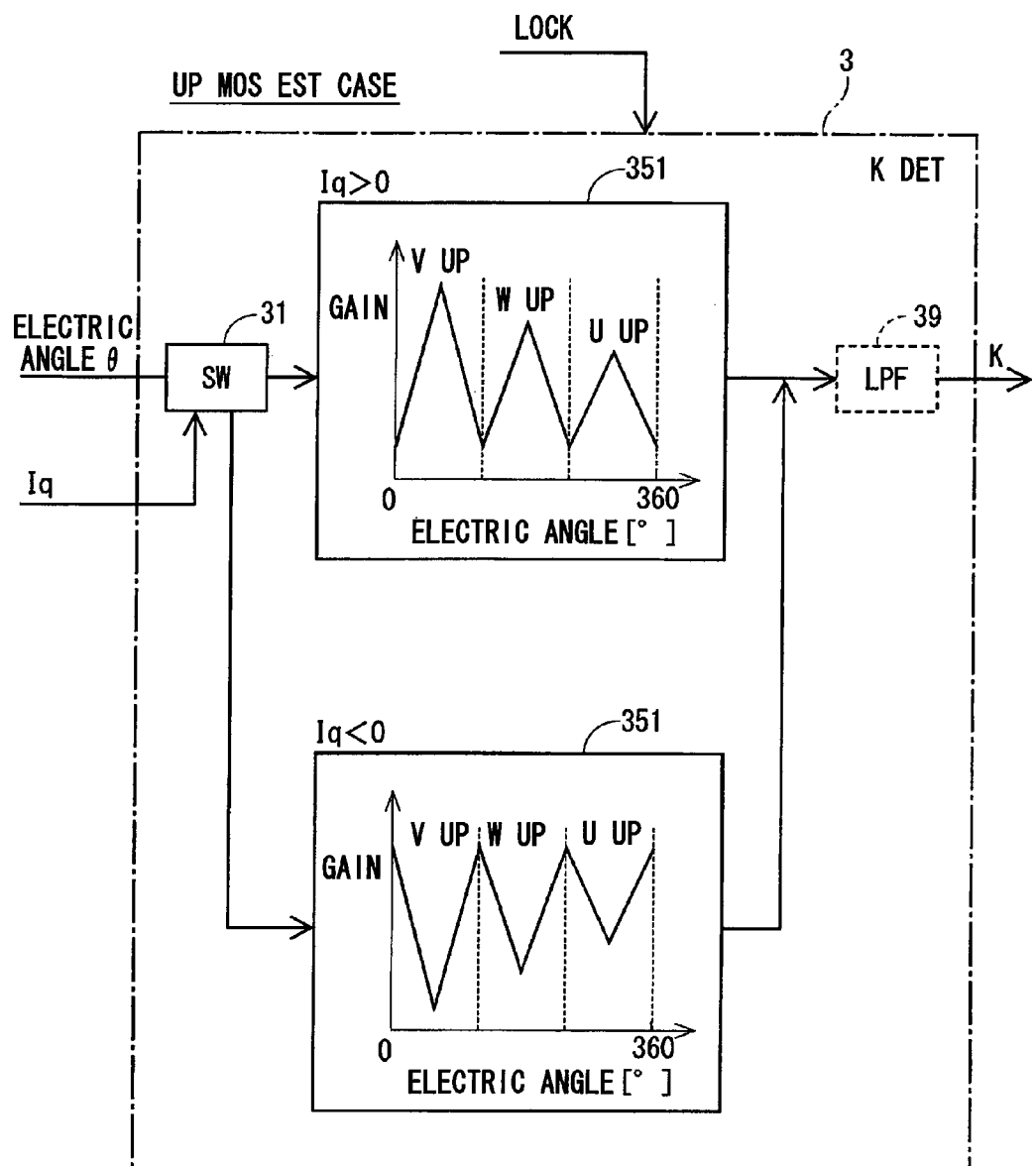
FIG. 22 is a block diagram illustrating the details of a gain determination portion in a case of an upper MOS estimation according to the fifth embodiment.
Figure 23:
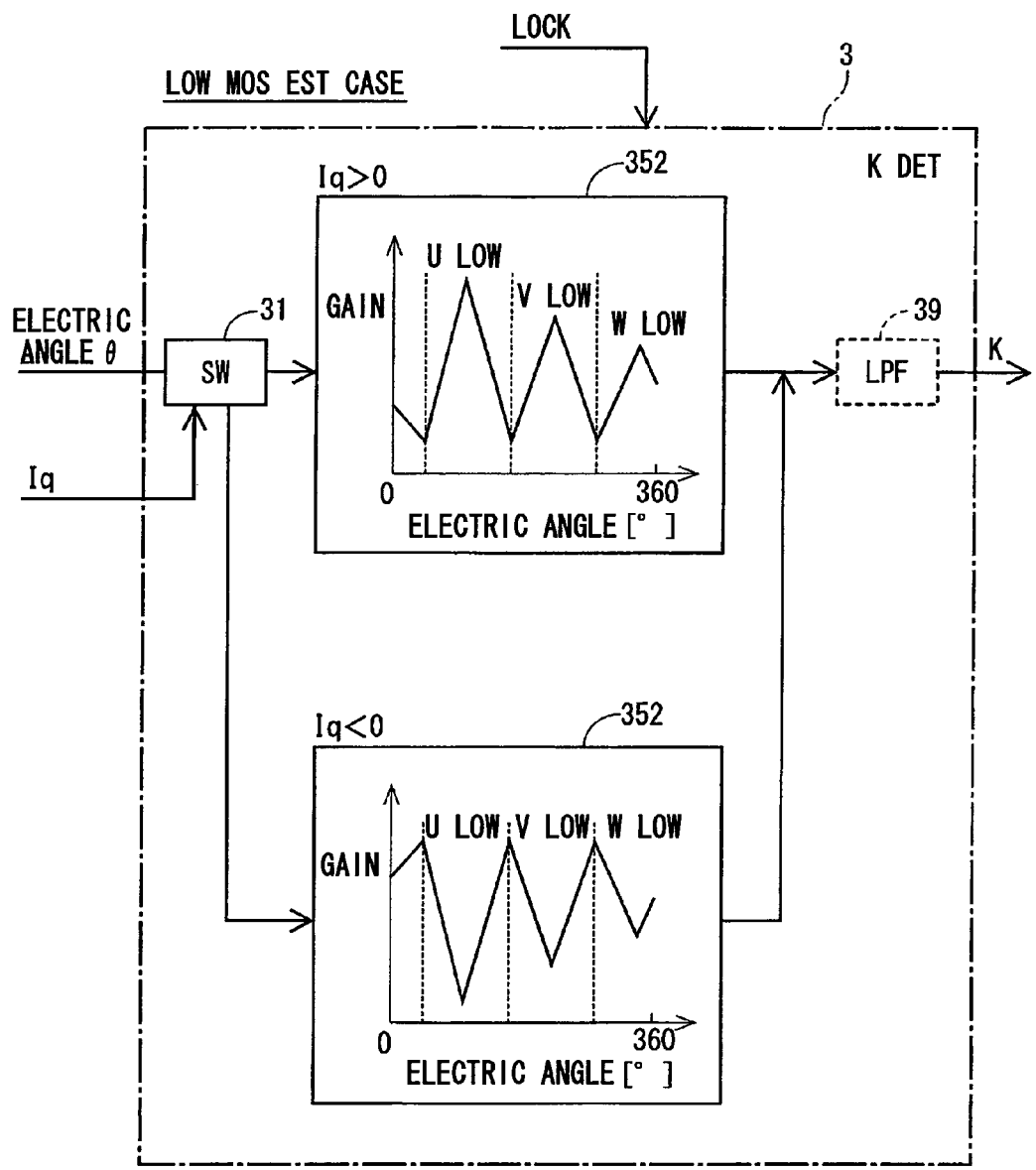
FIG. 23 is a block diagram illustrating the details of the gain determination portion in a case of a lower MOS estimation.

For example, when the q-axis current Iq is positive, it is supposed that the heat resistance related to the heat radiation from the junction of the MOS to the heat sink becomes larger in the order of a U-phase, a W-phase, and a V-phase in the upper MOS in the example of FIG. 22, and in the order of the W-phase, the V-phase, and the U-phase in the lower MOS in the example of FIG. 23. In the MOS of the phase having the smallest heat resistance, the temperature is unlikely to relatively rise at an electric angle θ in which the current amplitude is maximal. In the MOS of the phase in which the heat resistance is largest, the temperature is likely to relatively rise at the electric angle θ in which the current amplitude is maximum. In the upper MOS estimation map 351 and the lower MOS estimation map 352, the gain K is changed according to easiness of the temperature rise.

According to this configuration, even when there is a difference in the heat generation generated due to a difference in the heat resistance or the heat capacity related to the heat radiation from the junction of the MOS in each phase to the heat sink, it may be possible to estimate the temperature for each of the three-phase upper MOS group and the three-phase lower MOS group while taking the difference in the heat generation into account. Therefore, it may be possible to improve the temperature estimation precision.

Sixth Embodiment

In a sixth embodiment of the present disclosure, only differences from the fifth embodiment will be described with reference to FIG. 24. The configuration of the temperature estimation according to the sixth embodiment is identical with that in the fifth embodiment illustrated in FIG. 21.

Figure 24:
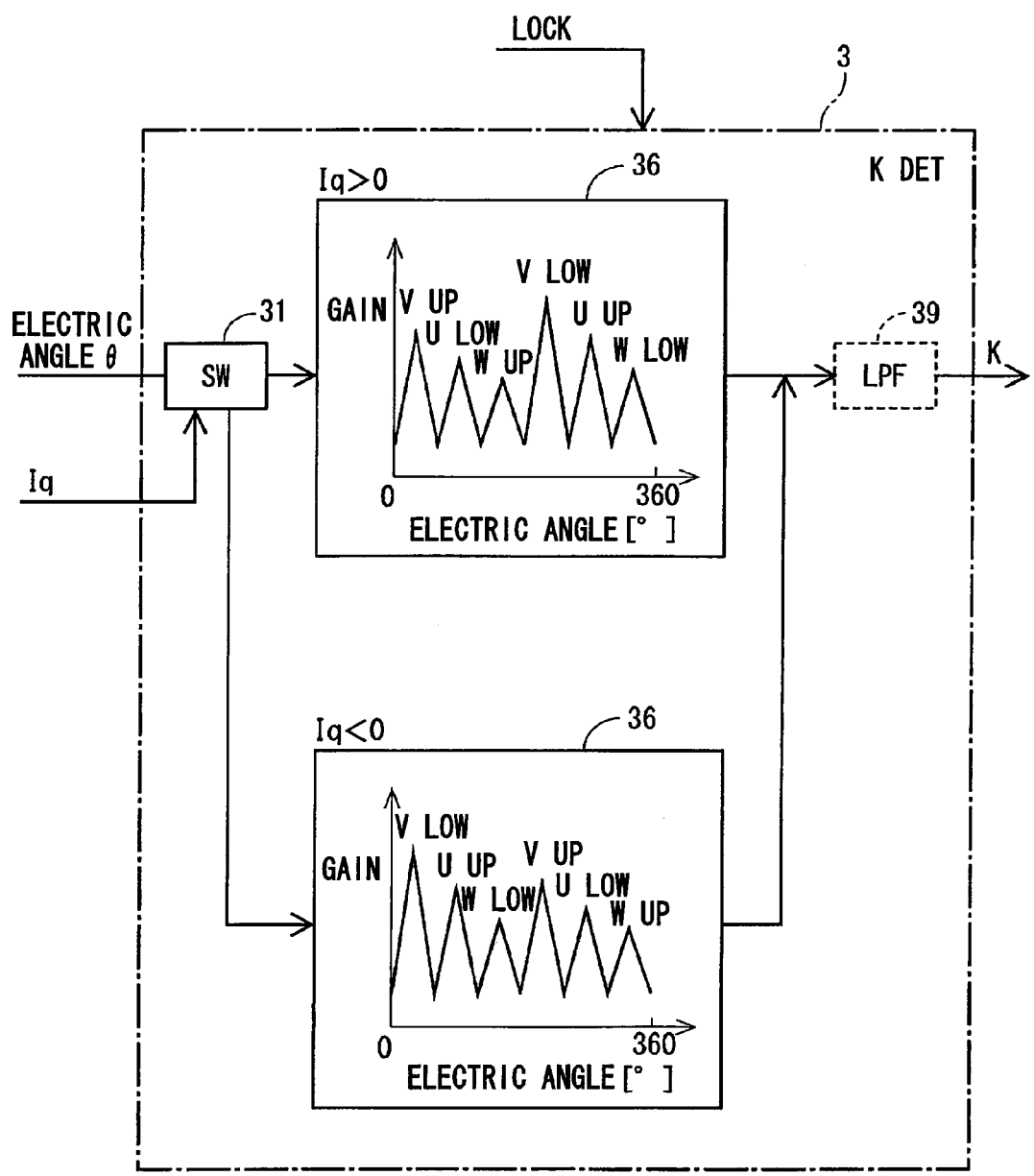
FIG. 24 is a block diagram illustrating the details of a gain determination portion according to the sixth embodiment.

As illustrated in FIG. 24, the gain determination portion 3 according to the sixth embodiment includes a switch 31, an upper and lower MOS shared estimation map 36, and an LPF 39. In the upper and lower MOS shared estimation map 36, two maps upside-down between a case where a q-axis current Iq is positive (Iq>0) and a case where the q-axis current Iq is negative (Iq<0) are set.

The upper and lower MOS shared estimation map 36 integrates the upper MOS estimation map 351 and the lower MOS estimation map 352 of the fifth embodiment into one piece, and a technical significance of the maps conforms to the fifth embodiment. In the sixth embodiment, since the gain K for temperature estimation of six MOSs 71 to 76 can be determined by one map, it may be possible to reduce a calculation load.

Other Embodiments

The first embodiment that changes the offset temperature or the response constant according to the supply voltage may be used in a brush DC motor. In this case, an H-bridge circuit corresponds to the "electric power converter".

In the present embodiment, the multiphase brushless motor is not limited to the three-phase brushless motor, but may be used to a brushless motor of four or more phases.

As an operating power supply of the IC 95, a dedicated power supply that is different from the battery 91, which is a power supply source of the inverter 70, may be used. When the temperature of the IC 95 is estimated, the offset temperature determination portion 5 changes the offset temperature T_off according to a voltage of the dedicated power supply.

A configuration in which the offset temperature T_off is changed may be configured to multiply a gain Ks to a temperature sensor value T_sns input to the sensor value adder 14, as indicated by a dashed line in FIG. 2.

In a configuration having a boost converter between the battery and the electric power converter, when a temperature of the switching element is estimated, it may be proper that a boosted voltage is used as "the input voltage input to the electric power converter". In this case, a sensor value of a voltage sensor disposed on an input part of the electric power converter may be acquired, or a boost command value to the boost comparator may be used.

In the characteristic diagrams of FIG. 3 to FIG. 5 according to the first embodiment, the relationships of the offset temperature T_off, the gain K, and the time constant τ to the supply voltage VB are represented by a right upward-sloping straight line or a downward-sloping straight line (a linear function). Those relationships are not limited to the straight line (a linear function), but may be stepwise, curved such as a quadratic function, or a combination of those shapes.

Figure 12:
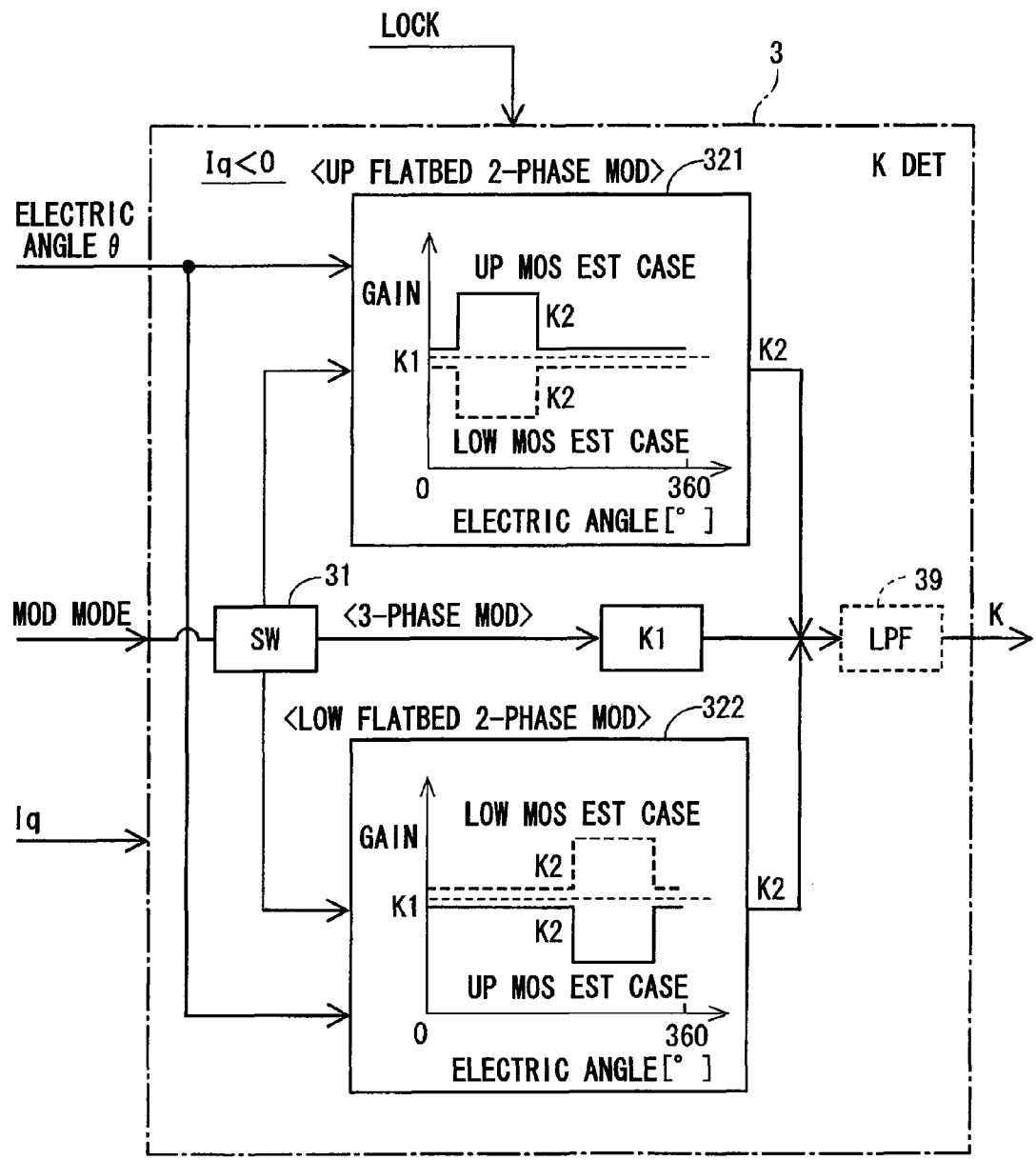
FIG. 12 is a block diagram illustrating the details of the gain determination portion in a case where q-axis current<0.

In FIG. 11 and FIG. 12 of the second embodiment, at the time of the upper/lower flatbed two-phase modulation, in the electric angle range where the DUTY of the upper MOS or the lower MOS is fixed to the upper limit value Dmax or the lower limit value Dmin, the gain K2 is changed stepwise as compared with the other electric angle range. In other words, the gain K2 is changed only in the "fixed range" where an influence of the heat generation is particularly large, and the DUTY change in the other electric angle range is ignored. According to this configuration, it may be possible effectively change the gain K2 with the minimum calculation load.

When there is a margin for the calculation capacity, the gain K2 may be changed to follow a change in the DUTY even in the electric angle range other than "fixed range". For example, a map of a multistage step shape, a trapezoidal shape, or a sine wave shape may be created according to the electric angle as compared with the two-stage stepwise map illustrated in FIG. 11 and FIG. 12.

In the second to sixth embodiments, the response constant determination portion 2 may change the response constant of the primary delay arithmetic unit 1 according to various input information even in the normal motor rotation state without the provision of the motor lock determination portion 6 indicated by a dashed line in the drawings.

In the gain determination portion 3, the time constant determination portion 4, and the offset temperature determination portion 5 in the respective embodiments, for example, when a sudden change in response constant and offset temperature is not an issue, the LPFs 39, 49, 59 indicated by a dashed line in the drawings may not be provided.

The inverter 70 corresponds to an example of the electric power converter. The MOSs 71 to 76 correspond to an example of the temperature estimation target element. The IC 95 corresponds to an example of the voltage dependent element and the temperature estimation target element.

The present disclosure relates to a motor control apparatus that drives a motor by controlling an electric power supplied by an electric power converter and estimates a temperature of a predetermined temperature estimation target element at the time of energizing the motor. For example, a switching element included in the electric power converter or an IC for performing control operation corresponds to the predetermined temperature estimation target element. The electric power converter is, for example, an inverter for a multiphase brushless motor. An H-bridge circuit for a brush DC motor.

A motor control apparatus according to a first aspect of the present disclosure includes a primary delay arithmetic unit, a sensor value adder, an offset adder, a response constant determination portion, and an offset temperature determination portion.

The primary delay arithmetic unit receives (i) a current square value of a current related to energization of a motor or (ii) a time average of an integrated value of the current square value. And, the primary delay arithmetic unit outputs a primary delay response that is calculated using a gain and a time constant as "the amount of temperature change".

The sensor value adder adds a sensor value of a temperature sensor to the amount of temperature change. The temperature sensor is mounted to the same substrate including, for example, a temperature estimation target element, and detects a temperature corresponding to a heat sink, which is a base temperature of element temperature estimation, and an initial temperature of the temperature estimation target element at the time of starting motor energization.

The offset adder adds an offset temperature to an output of the sensor value adder.

The response constant determination portion determines a gain of the primary delay arithmetic unit and a response constant of the time constant.

The offset temperature determination portion determines an offset temperature.

The motor control apparatus changes at least one of the response constant and the offset temperature according to a "supply voltage" to be supplied to the temperature estimation target element or an "input voltage" to be supplied to the electric power converter. For example, in a circuit configuration sharing the same battery as an IC operating power supply as the temperature estimation target element, and an input power supply of the inverter, both of the "supply voltage" and the "input voltage" correspond to a battery voltage.

What the "response constant is changed" means that at least one of the gain and the time constant is changed. In other words, the response constant determination portion may change only the gain, or only the time constant, or the offset temperature determination portion may change only the offset temperature.

Specifically, when the temperature estimation target element is used for temperature estimation of a voltage dependent element (for example, IC) having a power consumption changed due to the supply voltage, the offset temperature determination portion changes the offset temperature according to the supply voltage to be supplied to the voltage dependent element.

Alternatively, when the temperature estimation target element is used for temperature estimation of a switching element of the voltage dependent element or the electric power converter, the response constant determination portion changes the response constant according to an input voltage to be supplied to the electric power converter.

Accordingly, it may be possible to improve a temperature estimation precision. With an improvement in the temperature estimation precision, it may be possible to always prevent an excessive limitation of current from being performed on the assumption of a condition of the most severe temperature rise. Thus, it may be possible to provide the performance of the motor effectively. It may be possible downsize the heat sink and the switching element while the equivalent performance is maintained.

A motor control apparatus according to a second aspect of the present disclosure is applied to a multiphase motor, and includes a primary delay arithmetic unit, a sensor value adder, and a response constant determination portion.

The primary delay arithmetic unit receives a current square value of a current for energization of the motor or a time average of an integrated value of the current square value, and outputs a primary delay response calculated using a gain and a time constant as "the amount of temperature change".

The sensor value adder adds a sensor value of a temperature sensor to the amount of temperature change. The temperature sensor is mounted to the same substrate including, for example, a temperature estimation target element, and detects an initial temperature of the temperature estimation target element at the time of starting motor energization.

The response constant determination portion determines a gain of the primary delay arithmetic unit and a response constant of the time constant.

The response constant determination portion changes the response constant according to a change in the heat generation estimated in the temperature estimation target element, or a difference in the heat generation between the phases estimated for the temperature estimation target elements in multiple phases. What "response constant is changed" means that at least one of the gain and the time constant is changed.

The "change in the heat generation estimated in the temperature estimation target element" corresponds to, for example, a change in the on-time of the switching element. The heat generation becomes larger as the on-time is longer even when a current value is the same. In the "difference in the heat generation between the phases estimated in the multiphase temperature estimation target element", a difference (variation) in heat resistance or heat capacity of heat radiation from a junction of the switch element of each phase to a heat sink occurs due to, for example, a hardware factor such as a heat sink shape or a heat radiation structure corresponding to the switching element of each phase, and a heat generation difference occurs. The heat generation characteristic is different when a condition of the hardware affected on the heat radiation is different even when the operation of the switching element of each phase is same.

In a first example of the second aspect, the temperature estimation target element is used for temperature estimation of an upper arm element which is a switching element on a high potential side of the electric power converter subjected to PWM control, or a lower arm element which is a switching element on a low potential side of the electric power converter. The response constant determination portion changes the response constant on the basis of a "duty" which is a rate of an on-time or an off-time to a switching period of the upper arm element or the lower arm element.

As the switching element is longer in the on-time, the gain is increased more or the temperature rise is largely expecting with a reduction in the time constant. Thus, it may be possible to improve the temperature estimation precision.

In a second example of the second aspect, the temperature estimation target element is used for temperature estimation of an upper arm element which is a switching element on a high potential side of the electric power converter, or a lower arm element which is a switching element on a low potential side of the electric power converter. The response constant determination portion changes the response constant according to a "difference in heat generation caused by a difference in the heat resistance or the heat capacity of hardware" according to the energization of each phase.

It may be possible to improve the temperature estimation precision by largely expecting the temperature rise with an increase in the gain or a reduction in the time constant for the switching element of the phase whose temperature is likely to increase in which the heat resistance of the hardware, in detail, the heat resistance against the heat radiation from the junction of the switching element to the heat sink is large.

With an improvement in the temperature estimation precision, it may be possible to prevent a current from being always excessively limited on the assumption of a condition of the most severe temperature rise. Therefore, it may be possible to exhibit the performance of the motor effectively. It may be possible to downsize the heat sink and the switching element while the equivalent performance is maintained.

While the embodiments, the configurations, and the modes of the motor control apparatus according to the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A motor control apparatus that estimates a temperature of a predetermined temperature estimation target element at a time of energizing a motor and drives the motor by controlling an electric power supplied by an electric power converter, the motor control apparatus comprising:
    a primary delay arithmetic unit that
        receives a current square value of a current supplied to the motor or a time average of an integrated value of the current square value, and
        outputs, as an amount of temperature change, a primary delay response calculated using a gain and a time constant;
    a sensor value adder that adds a sensor value of a temperature sensor to the amount of temperature change;
    an offset adder that adds an offset temperature to an output of the sensor value adder;
    a response constant determination portion that determines the gain and the time constant of the primary delay arithmetic unit, the gain and the time constant being a response constant; and
    an offset temperature determination portion that determines the offset temperature,
    wherein:
    at least one of the response constant and the offset temperature is changed according to a supply voltage that is supplied to the temperature estimation target element, or an input voltage that is supplied to the electric power converter, and
    the offset temperature determination portion sets the offset temperature to be larger from a lower limit value to an upper limit value, as the supply voltage inputted to the offset temperature determination portion is greater.

2. The motor control apparatus according to claim 1, wherein:
    the temperature estimation target element is a voltage dependent element in which power consumption changes according to the supply voltage;
    the temperature of the voltage dependent element is estimated; and
    the offset temperature determination portion changes the offset temperature according to the supply voltage supplied to the voltage dependent element.

3. The motor control apparatus according to claim 1, wherein:
    the temperature estimation target element is
        a switching element of the electric power converter, or
        a voltage dependent element in which a power consumption changes according to the supply voltage;
    the temperature of the temperature estimation target element is estimated; and
    the response constant determination portion changes the response constant according to the input voltage supplied to the electric power converter.

* * * * *